US008213603B2

(12) United States Patent
Nobukata

(10) Patent No.: US 8,213,603 B2
(45) Date of Patent: Jul. 3, 2012

(54) ENCRYPTION PROCESSING APPARATUS

(75) Inventor: Hiromi Nobukata, Kanagawa (JP)

(73) Assignee: Sony Corporation, Tokyo (JP)

( * ) Notice: Subject to any disclaimer, the term of this patent is extended or adjusted under 35 U.S.C. 154(b) by 185 days.

(21) Appl. No.: 12/718,052

(22) Filed: Mar. 5, 2010

(65) Prior Publication Data

US 2010/0232602 A1 Sep. 16, 2010

(30) Foreign Application Priority Data

Mar. 13, 2009 (JP) ................................ P2009-061537

(51) Int. Cl.
*H04K 1/00* (2006.01)
*G06F 1/16* (2006.01)

(52) U.S. Cl. .......................................... 380/28; 708/100

(58) Field of Classification Search .................... 380/28; 708/100

See application file for complete search history.

(56) References Cited

U.S. PATENT DOCUMENTS

| | | | |
|---|---|---|---|
| 6,031,911 | A | 2/2000 | Adams et al. |
| 6,295,606 | B1 | 9/2001 | Messerges et al. |
| 2007/0076864 | A1 | 4/2007 | Hwang |

FOREIGN PATENT DOCUMENTS

| | | |
|---|---|---|
| JP | 2004 347975 | 12/2004 |
| WO | WO 00 41356 | 7/2000 |
| WO | WO 01 08012 | 2/2001 |
| WO | WO 2005 081085 | 9/2005 |
| WO | WO 2007 012102 | 2/2007 |

OTHER PUBLICATIONS

Goubin L. et al.: Des and Differential Power Analysis the "Duplication" Method Cryptographic Hardware and Embedded Systems. 1st International Workshop, Ches '99. Worcester, Ma, Aug. 12-13, 1999 Proceedings; [Lecture Notes in Computer Science], Berlin : Springer, De, vol. 1717, Aug. 1, 1999, pp. 158-172, XP000952192 ISBN: 978-3-540-66646-2.

*Primary Examiner* — Philip Chea

(74) *Attorney, Agent, or Firm* — Frommer Lawrence & Haug LLP; William S. Frommer

(57) ABSTRACT

Disclosed herein is an encryption processing apparatus including: a first register device; a second register device; a first flag operation device; a first operation device; a second operation device; a round operation device; a third and a fourth operation device; a second flag operation device; and a fifth operation device.

14 Claims, 22 Drawing Sheets

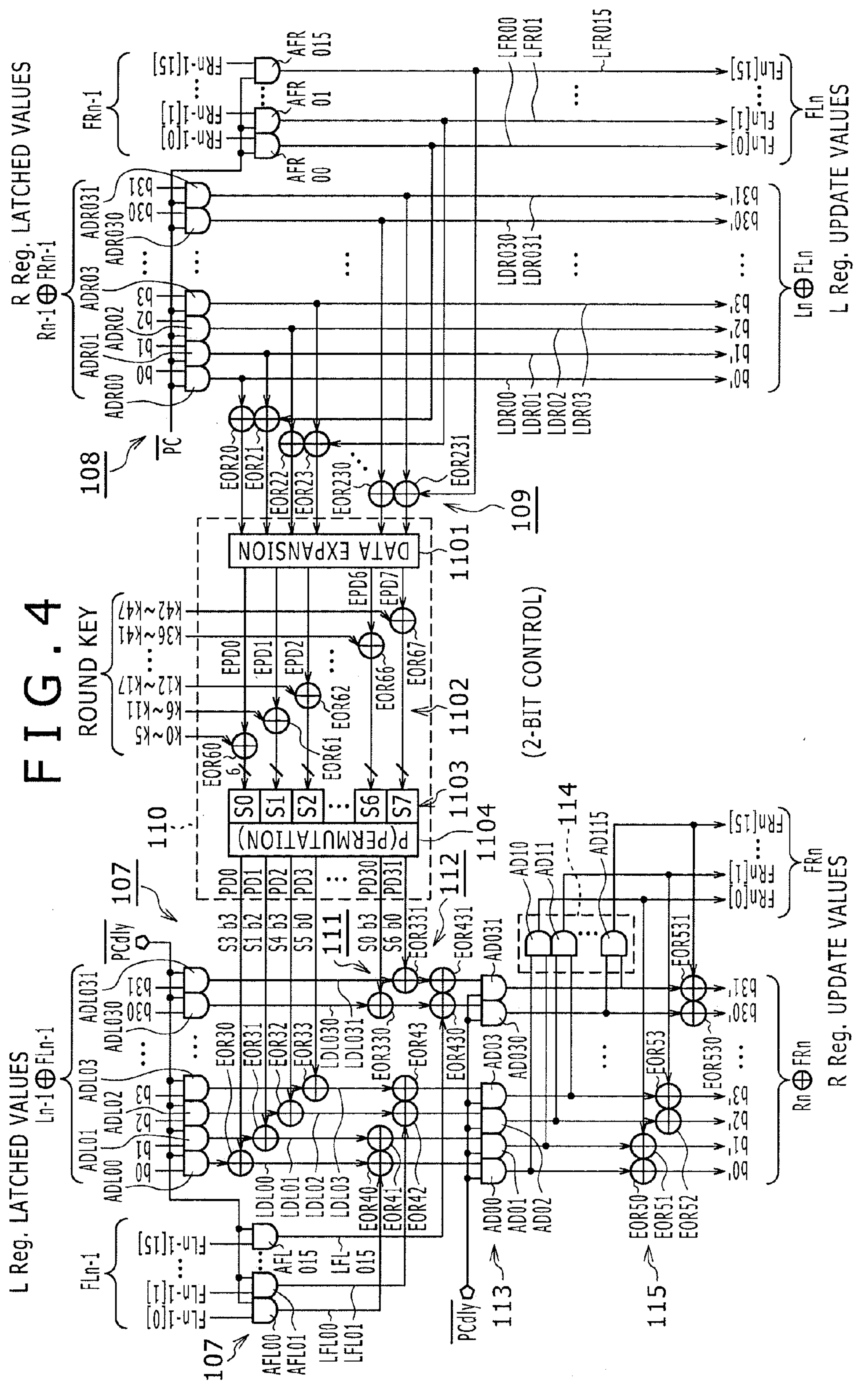
F I G . 4

FIG. 6

| b0 | b1 | FRn | b0' | b1' | HW |
|---|---|---|---|---|---|
| 0 | 0 | 0 | 0 | 0 | 0 |
| 0 | 1 | 0 | 0 | 1 | 1 |
| 1 | 0 | 0 | 1 | 0 | 1 |
| 1 | 1 | 1 | 0 | 0 | 1 |

DATA (b0, b1) — CONTROL DATA (FRn, b0', b1', HW)

CONTROLLED RESULTS

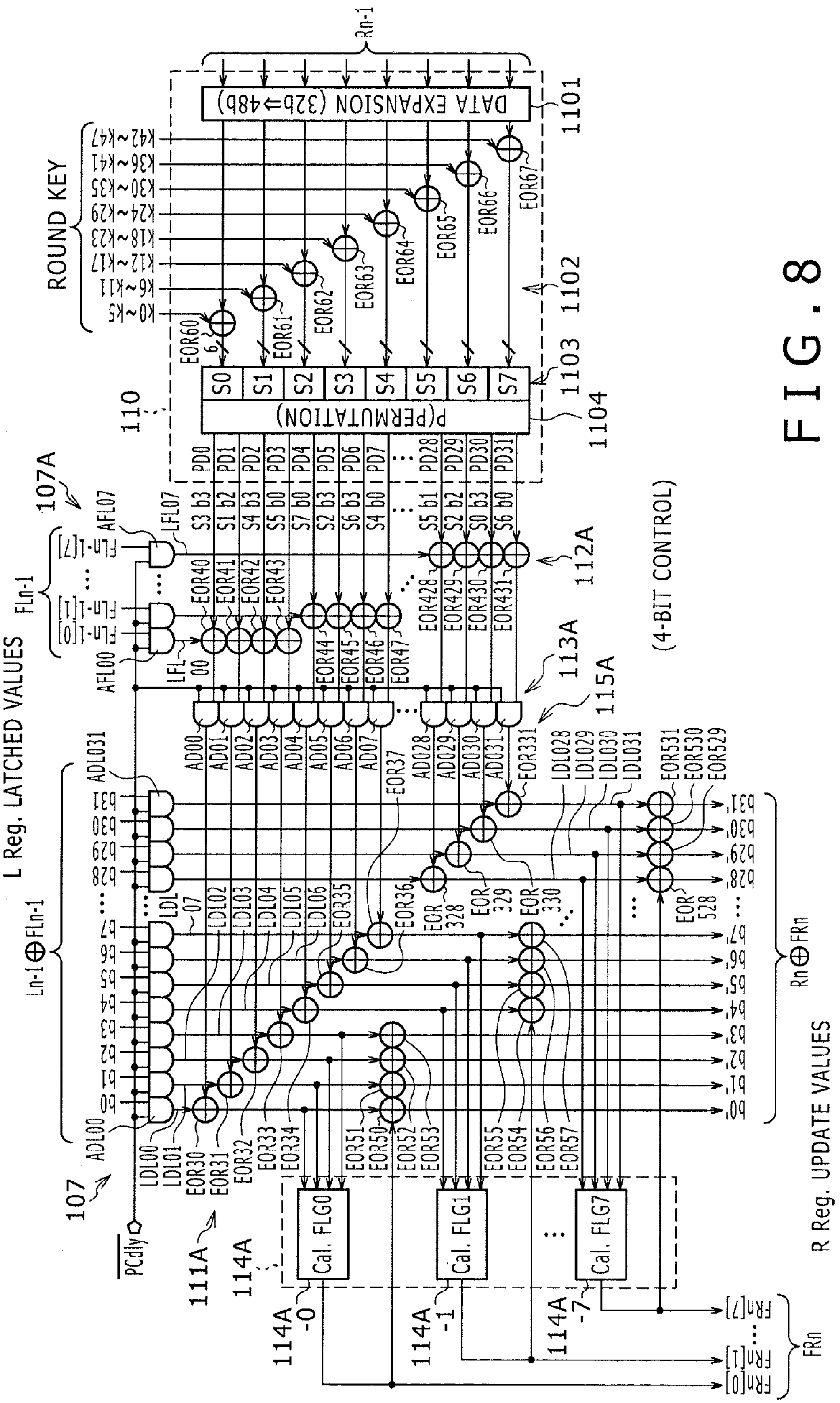
F I G . 8

BEFORE CONTROLLED
(ORIGINAL VALUES)

| b0 | b1 | b2 | b3 | HW |
|---|---|---|---|---|
| 0 | 0 | 0 | 0 | 0 |
| 0 | 0 | 0 | 1 | 1 |
| 0 | 0 | 1 | 0 | 1 |
| 0 | 0 | 1 | 1 | 2 |
| 0 | 1 | 0 | 0 | 1 |
| 0 | 1 | 0 | 1 | 2 |
| 0 | 1 | 1 | 0 | 2 |
| 0 | 1 | 1 | 1 | 3 |
| 1 | 0 | 0 | 0 | 1 |
| 1 | 0 | 0 | 1 | 2 |
| 1 | 0 | 1 | 0 | 2 |
| 1 | 0 | 1 | 1 | 3 |
| 1 | 1 | 0 | 0 | 2 |
| 1 | 1 | 0 | 1 | 3 |
| 1 | 1 | 1 | 0 | 3 |
| 1 | 1 | 1 | 1 | 4 |

AFTER CONTROLLED
(ACTUAL VALUES)

| FLGn | b0' | b1' | b2' | b3' | HW' |
|---|---|---|---|---|---|
| 0 | 0 | 0 | 0 | 0 | 0 |
| 0 | 0 | 0 | 0 | 1 | 1 |
| 0 | 0 | 0 | 1 | 0 | 1 |
| 0 | 0 | 0 | 1 | 1 | 2 |
| 0 | 0 | 1 | 0 | 0 | 1 |
| 0 | 0 | 1 | 0 | 1 | 2 |
| 0 | 0 | 1 | 1 | 0 | 2 |
| 1 | 1 | 0 | 0 | 0 | 2 |
| 0 | 1 | 0 | 0 | 0 | 1 |
| 0 | 1 | 0 | 0 | 1 | 2 |
| 0 | 1 | 0 | 1 | 0 | 2 |
| 1 | 0 | 1 | 0 | 0 | 2 |
| 0 | 1 | 1 | 0 | 0 | 2 |
| 1 | 0 | 0 | 1 | 0 | 2 |
| 1 | 0 | 0 | 0 | 1 | 2 |
| 1 | 0 | 0 | 0 | 0 | 1 |

CONTROLLED RESULTS

FIG. 13
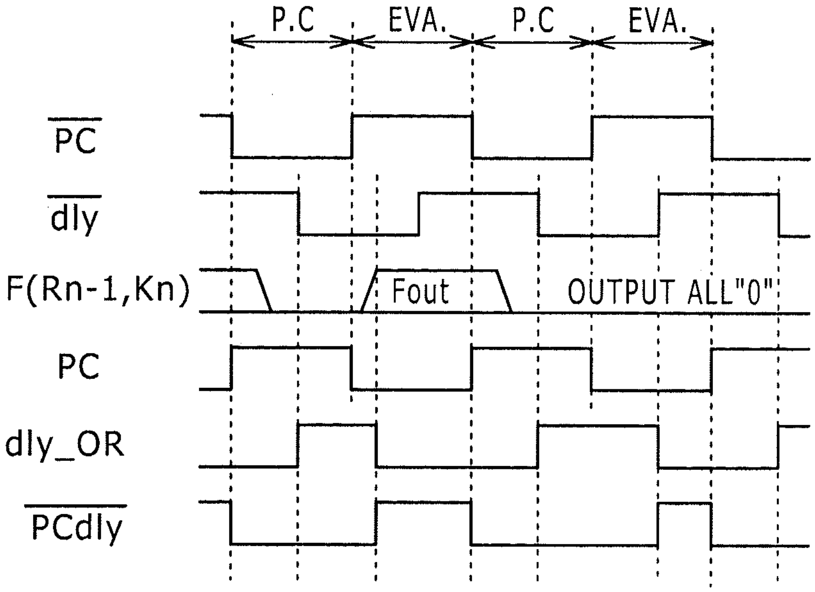
FIG. 14A
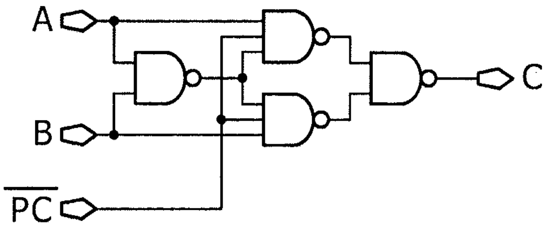
400
FIG. 14B
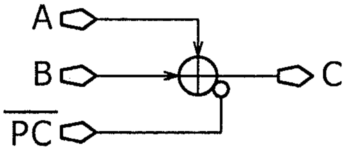
FIG. 14C
| $\overline{PC}$ | A | B | C |
|---|---|---|---|
| L | – | – | L |
| H | L | L | L |
| H | L | H | H |
| H | H | L | H |
| H | H | H | L |

FIG.15

| ORIGINAL DATA | ACTUAL DATA |
|---|---|
| 0 | 0 |
| 0 | 1 |
| 1 | 0 |
| 1 | 1 |

| b0<br>b0' | b1<br>b1' | b2<br>b2' | b3<br>b3' |
|---|---|---|---|
| 7 | 7 | 7 | 7 |
| 1 | 1 | 1 | 1 |
| 4 | 4 | 4 | 4 |
| 4 | 4 | 4 | 4 |

FIG.18A

| b0 | b1 | b2 | b3 | HW |
|---|---|---|---|---|
| 0 | 0 | 0 | 0 | 0 |
| 0 | 0 | 0 | 1 | 1 |
| 0 | 0 | 1 | 0 | 1 |
| 0 | 0 | 1 | 1 | 2 |
| 0 | 1 | 0 | 0 | 1 |
| 0 | 1 | 0 | 1 | 2 |
| 0 | 1 | 1 | 0 | 2 |
| 0 | 1 | 1 | 1 | 3 |
| 1 | 0 | 0 | 0 | 1 |
| 1 | 0 | 0 | 1 | 2 |
| 1 | 0 | 1 | 0 | 2 |
| 1 | 0 | 1 | 1 | 3 |
| 1 | 1 | 0 | 0 | 2 |
| 1 | 1 | 0 | 1 | 3 |
| 1 | 1 | 1 | 0 | 3 |
| 1 | 1 | 1 | 1 | 4 |

FIG.18B

AFTER CONTROLLED (ACTUAL VALUES)

| FLG n0 | FLG n1 | FLG n2 | b0' | b1' | b2' | b3' | HW' |
|---|---|---|---|---|---|---|---|
| 0 | 1 | 1 | 0 | 0 | 0 | 0 | 2 |
| 0 | 1 | 0 | 0 | 0 | 0 | 1 | 2 |
| 0 | 1 | 0 | 0 | 0 | 1 | 0 | 2 |
| 0 | 0 | 0 | 0 | 0 | 1 | 1 | 2 |
| 0 | 1 | 0 | 0 | 1 | 0 | 0 | 2 |
| 0 | 0 | 0 | 0 | 1 | 0 | 1 | 2 |
| 0 | 0 | 0 | 0 | 1 | 1 | 0 | 2 |
| 1 | 0 | 0 | 1 | 0 | 0 | 0 | 2 |
| 0 | 1 | 0 | 1 | 0 | 0 | 0 | 2 |
| 0 | 0 | 0 | 1 | 0 | 0 | 1 | 2 |
| 0 | 0 | 0 | 1 | 0 | 1 | 0 | 2 |
| 1 | 0 | 0 | 0 | 1 | 0 | 0 | 2 |
| 0 | 0 | 0 | 1 | 1 | 0 | 0 | 2 |
| 1 | 0 | 0 | 0 | 0 | 1 | 0 | 2 |
| 1 | 0 | 0 | 0 | 0 | 0 | 1 | 2 |
| 1 | 0 | 1 | 0 | 0 | 0 | 0 | 2 |

DATA CONTROLLED EXAMPLE (4-BIT)

BEFORE CONTROLLED
(ORIGINAL VALUES)

AFTER CONTROLLED
(ACTUAL VALUES)

| | b0 | b1 | b2 | b3 | HW | FLGn | b0' | b1' | b2' | b3' | HW' |
|---|---|---|---|---|---|---|---|---|---|---|---|
| d0 | 0 | 0 | 0 | 0 | 0 | 0 | 0 | 0 | 0 | 0 | 0 |
| d1 | 0 | 0 | 0 | 1 | 1 | 1 | 1 | 1 | 1 | 0 | 4 |
| d2 | 0 | 0 | 1 | 0 | 1 | 1 | 1 | 1 | 0 | 1 | 4 |
| d3 | 0 | 0 | 1 | 1 | 2 | 0 | 0 | 0 | 1 | 1 | 2 |
| d4 | 0 | 1 | 0 | 0 | 1 | 1 | 1 | 0 | 1 | 1 | 4 |
| d5 | 0 | 1 | 0 | 1 | 2 | 0 | 0 | 1 | 0 | 1 | 2 |
| d6 | 0 | 1 | 1 | 0 | 2 | 0 | 0 | 1 | 1 | 0 | 2 |
| d7 | 0 | 1 | 1 | 1 | 3 | 1 | 1 | 0 | 0 | 0 | 2 |
| d8 | 1 | 0 | 0 | 0 | 1 | 0 | 1 | 0 | 0 | 0 | 1 |
| d9 | 1 | 0 | 0 | 1 | 2 | 1 | 0 | 1 | 1 | 0 | 3 |
| d10 | 1 | 0 | 1 | 0 | 2 | 1 | 0 | 1 | 0 | 1 | 3 |
| d11 | 1 | 0 | 1 | 1 | 3 | 0 | 1 | 0 | 1 | 1 | 3 |
| d12 | 1 | 1 | 0 | 0 | 2 | 1 | 0 | 0 | 1 | 1 | 3 |
| d13 | 1 | 1 | 0 | 1 | 3 | 0 | 1 | 1 | 0 | 1 | 3 |
| d14 | 1 | 1 | 1 | 0 | 3 | 0 | 1 | 1 | 1 | 0 | 3 |
| d15 | 1 | 1 | 1 | 1 | 4 | 1 | 0 | 0 | 0 | 0 | 1 |

DATA CONTROLLED EXAMPLE (4-BIT)

FIG. 21

| ORIGINAL DATA | ACTUAL DATA | b0 / b0' | b1 / b1' | b2 / b2' | b3 / b3' | b0 / b3' | b1 / b0' | b2 / b1' | b3 / b2' | b0 / b2' | b1 / b3' | b2 / b0' | b3 / b1' | b0 / b1' | b1 / b2' | b2 / b3' | b3 / b0' |
|---|---|---|---|---|---|---|---|---|---|---|---|---|---|---|---|---|---|
| 0 | 0 | 4 | 4 | 4 | 4 | 4 | 4 | 4 | 4 | 4 | 4 | 4 | 4 | 4 | 4 | 4 | 4 |
| 0 | 1 | 4 | 4 | 4 | 4 | 4 | 4 | 4 | 4 | 4 | 4 | 4 | 4 | 4 | 4 | 4 | 4 |
| 1 | 0 | 4 | 4 | 4 | 4 | 4 | 4 | 4 | 4 | 4 | 4 | 4 | 4 | 4 | 4 | 4 | 4 |
| 1 | 1 | 4 | 4 | 4 | 4 | 4 | 4 | 4 | 4 | 4 | 4 | 4 | 4 | 4 | 4 | 4 | 4 |

DATA CONTROLLED EXAMPLE (4-BIT)

| | BEFORE CONTROLLED (ORIGINAL VALUES) | | | | | AFTER CONTROLLED (ACTUAL VALUES) | | | | | |
|---|---|---|---|---|---|---|---|---|---|---|---|
| | b0 | b1 | b2 | b3 | | FLGn | b0' | b1' | b2' | b3' | HW' |
| d0 | 0 | 0 | 0 | 0 | | 0 | 0 | 0 | 0 | 0 | 0 |
| d1 | 0 | 0 | 0 | 1 | 6 | 1 | 1 | 1 | 1 | 0 | 4 |
| d2 | 0 | 0 | 1 | 0 | | 1 | 1 | 1 | 0 | 1 | 4 |
| d3 | 0 | 0 | 1 | 1 | | 0 | 0 | 0 | 1 | 1 | 2 |
| d4 | 0 | 1 | 0 | 0 | | 1 | 1 | 0 | 1 | 1 | 4 |
| d5 | 0 | 1 | 0 | 1 | 9 | 0 | 0 | 1 | 0 | 1 | 2 |
| d6 | 0 | 1 | 1 | 0 | | 0 | 0 | 1 | 1 | 0 | 2 |
| d7 | 0 | 1 | 1 | 1 | | 1 | 1 | 0 | 0 | 0 | 2 |
| d8 | 1 | 0 | 0 | 0 | | 0 | 1 | 0 | 0 | 0 | 1 |
| d9 | 1 | 0 | 0 | 1 | 6 | 1 | 0 | 1 | 1 | 0 | 3 |
| d10 | 1 | 0 | 1 | 0 | | 1 | 0 | 1 | 0 | 1 | 3 |
| d11 | 1 | 0 | 1 | 1 | | 0 | 1 | 0 | 1 | 1 | 3 |
| d12 | 1 | 1 | 0 | 0 | | 1 | 0 | 0 | 1 | 1 | 3 |
| d13 | 1 | 1 | 0 | 1 | 9 | 0 | 1 | 1 | 0 | 1 | 3 |
| d14 | 1 | 1 | 1 | 0 | | 0 | 1 | 1 | 1 | 0 | 3 |
| d15 | 1 | 1 | 1 | 1 | | 1 | 0 | 0 | 0 | 0 | 1 |

ENCRYPTION PROCESSING APPARATUS

BACKGROUND OF THE INVENTION

1. Field of the Invention

The present invention relates to an encryption processing apparatus applied illustratively to IC cards. More particularly, the invention relates to an encryption processing apparatus which, operating at a small current, enhances resistance to power analysis known as attacks constituting cryptanalysis processing.

2. Description of the Related Art

FIG. 1 schematically shows a typical structure of an IC card having general encryption capabilities. As shown in FIG. 1, the IC card 1 is made up of an antenna 2 and an IC chip (LSI) 3. The IC chip 3 includes a rectification circuit 4, a smoothing capacitor 5, a voltage stabilization circuit 6, a CPU 7, a memory 8, an encryption circuit 9, peripheral circuits 10, and an RF interface (I/F) 11. The CPU 7, memory 8, encryption circuit 9, peripheral circuits 10, and RF interface 11 exchange data therebetween via a signal bus 12.

As shown in FIG. 1, when brought close to a reader, the IC card 1 with its encryption capabilities detects a feeble magnetic field from the reader, acquires a necessary signal, and gets the antenna 2 to convert the magnetic field into power to operate the IC for desired processing.

In a system of the above-outlined structure, data is encrypted when exchanged between the IC card 1 and a host computer. In addition to the CPU 7 and memory 8, the IC chip 3 has the encryption circuit 9 that decrypts the received signal to obtain relevant information for necessary processing. The obtained information is encrypted and sent to the host computer.

The most commonly utilized encryption method today is DES (Data Encryption Standard). According to DES, the same key is possessed by both the owner of the IC card and the host computer. The data transmitting side encrypts data using the key before sending the encrypted data. The data receiving side decrypts the received data using the same key to retrieve a message. A malicious third party may attempt to eavesdrop on such communication but, without the key, should have difficulty decrypting the encrypted message.

FIG. 2 schematically shows a common structure of a DES operation circuit 20 as a typical decryption circuit. As shown in FIG. 2, the DES operation circuit 20 includes an initial permutation (IP) device 21, switches 22L and 22R, a left (L) register 23, and a right (R) register 24. The DES operation circuit 20 further includes an F-function device 25, an EXOR operation device 26, an inverse permutation ($IP^{-1}$) device 27, and an encrypted text output device (Crypto) 28.

As shown in FIG. 2, the F-function device 25 has a plurality (8 in FIG. 2) of S-boxes $S_0$ through $S_7$ for executing nonlinear processing. An input value F-in from the upstream stage (i.e., R(n−1)) is expanded to 48 bits by an expansion device (EX) 25-1 before being subjected to the EXOR operations performed by an EXOR operation device 25-2 using a key (48 bits) Kn from a key scheduling device. The output of the EXOR operation device 25-2 is input to the plurality of S-boxes $S_0$ through $S_7$ carrying out nonlinear conversion processes in six bits each. Each of the S-boxes $S_0$ through $S_7$ performs a nonlinear conversion process from six to four bits using a conversion table.

The output bits from the S-boxes $S_0$ through $S_7$ (4×8=32 bits) are input to a permutation device (P) 25-3 for bit position permutation to generate and output an F-function output of 32 bits.

Inside the DES operation circuit 20 are an operation circuit commensurate with a round operation and a register arrangement equivalent to the data width in effect. The circuit is operated a predetermined number of times to perform encryption processing.

When rounds are switched, the register values are updated. The updating of the registers is accompanied by charging and discharging of the signal wires connected to the registers as well as by arithmetic operations of the operation circuit.

During the arithmetic operations, the most arduous of the charging and discharging currents on the signal wires occur when the signal wires are brought from all 0's to all 1's. A power supply device retrieving power from the antenna needs to supply power with a sufficient margin.

P. Kocher and others report on an attack known as DPA (differential power analysis) whereby the currents consumed by an encryption circuit are statistically analyzed in order to extract a key. The environment necessary for this attack can be mounted at low cost and the key can be extracted in a short time. It is imperative for secure IC's to provide against this type of attack.

The DPA attack involves extracting the key by statistically analyzing feeble operation currents related to the key during the output being made by the S-boxes carrying out nonlinear processes as well as during charging and discharging of the load wires for the registers while their intermediate values are being updated. The following two methods have been proposed to counter the attack:

First, a complementary structure is adopted so that any leak current can be minimized by complementary operations. Second, data is randomized to perturb leak currents whereby statistical analysis is made difficult.

An example of the first method above for countering DPA attacks is the technique disclosed illustratively in Japanese Patent Laid-open No. 2004-347975. The disclosed technique involves developing one-bit data into two-bit values of equal Hamming weights. Two phases composed of an evaluation phase and a pre-charge phase are provided in view of data transitions brought about by arithmetic operations. Control is exercised in such a manner that data is brought to a state that is neither "0" nor "1" before being arithmetically operated on. This makes it difficult to detect changing currents stemming from the transitions of the computed values.

More specifically, a data item of, say, "0" is regarded as "01" and a data item "1" as "10" as they are submitted to encryption operations. When the data items are to be changed by a round operation, they are first brought to "00" before being shifted to computed data.

Suppose now that the transitions are expressed as follows:

transition "0"->"0": "01"->"00"->"01";
transition "0"->"1": "01"->"00"->"10";
transition "1"->"0": "10"->"00"->"01";
transition "1"->"1": "10"->"00"->"10."

In such a case, all transitions of the bits based on arithmetic operations are changed only in one bit regardless of the computed results. This makes it difficult to extract a key from the changing currents.

An example of the second method above for countering DPA attacks is the technique disclosed illustratively in U.S. Pat. No. 6,295,606. This technique involves disturb outputs from S-boxes using random numbers in order to disturb feeble currents from circuit operations reflecting the key in use, thereby making statistical analysis of the consumed currents difficult.

SUMMARY OF THE INVENTION

However, the first method above needs a structure for causing all circuits performing encryption operations to carry out complementary operations of two bits on one-bit data. This results in at least doubling the scale of circuitry. Because one of the expanded two bits is typically subject to circuit operations, the consumed currents are at least doubled.

To implement the second method above desires generating random numbers commensurate with the width of the data to be disturbed before any encryption operations take place. That is, a random number generation circuit is desired.

The embodiments of the present invention have been made under the above circumstances and provide an encryption processing apparatus capable of enhancing resistance to power analysis while operating at a small current.

In carrying out the embodiments of the present invention and according to one embodiment thereof, there is provided an encryption processing apparatus including: a first register device configured to include a first data register and a first flag register; a second register device configured to include a second data register and a second flag register; a first flag operation device configured to perform flag operations on first data and second data of an input plain text for each group of a predetermined number of bits; a first operation device configured to cause the first flag operation device to perform exclusive-OR operations on each of the first and the second data and on the flags in effect for flag control, the first operation device being further configured to feed the flag-controlled first data and first flag to the first register device and the flag-controlled second data and second flag to the second register device; a second operation device configured to perform exclusive-OR operations on the latched data in the second data register of the second register device and on the flag of the second flag register; a round operation device configured to perform a round operation on output data from the second operation device; a third and a fourth operation device configured to perform exclusive-OR operations on the output from the round operation device and on the latched value in the first data register of the first register device as well as on the flag of the first flag register; a second flag operation device configured to perform a new flag operation on output data from the third and the fourth operation devices for each group of a predetermined number of bits; and a fifth operation device configured to cause the second flag operation device to perform exclusive-OR operations on the output data from the third and the fourth operation devices and on the flags in effect for flag control, the fifth operation device being further configured to output the flag-controlled data and flags to the second register device.

The above-outlined encryption processing apparatus according to the embodiments of the present invention reduces the currents consumed by the encryption operation circuits making up the apparatus while enhancing resistance to power analysis.

BRIEF DESCRIPTION OF THE DRAWINGS

FIG. 4 is a circuit diagram partially showing a typical structure of the DES operation circuit in FIG. 3;

FIG. 6 is a schematic view showing relations between two-bit data and controlled data with regard to the DES operation circuit as the first embodiment;

FIG. 8 is a circuit diagram partially showing a typical structure of the DES operation circuit in FIG. 7;

FIG. 13 is a timing chart of the circuit in FIG. 12;

FIGS. 14A, 14B and 14C show an EXOR-AND circuit, circuit symbols, and a truth table respectively;

FIG. 15 is a schematic view showing the controlled results of FIG. 10 seen from a data disturbance point of view in conjunction with a DES operation circuit as a third embodiment of the present invention;

FIGS. 18A and 18B are schematic views showing results from the operations performed by the flag operation circuit in FIG. 17, thus presenting relations between four-bit data and controlled data with regard to the DES operation circuit as the third embodiment;

FIG. 21 is a schematic view showing controlled states of “0” and “1” in each of the bits involved in FIGS. 20A and 20B;

DETAILED DESCRIPTION OF THE PREFERRED EMBODIMENTS

The preferred embodiments of the present invention will now be described in reference to the accompanying drawings. The description will be presented under the following headings:

1. First embodiment (first structure example of the DES operation circuit)
2. Second embodiment (second structure example of the DES operation circuit)
3. Third embodiment (third structure example of the DES operation circuit)
4. Fourth embodiment (fourth structure example of the DES operation circuit)
5. Fifth embodiment (structure example of the AES operation circuit)

The encryption processing apparatus embodying the embodiments of the present invention is structured in such a manner as to accomplish at least the following three objectives:

<1> Reduce the charging and discharging currents of the signal bus by lowering the number of "1" bits (i.e., Hamming weight, or HW) in the intermediate value of computed results.

<2> Improve resistance to DPA by keeping substantially constant the HW of the intermediate value of computed results.

<3> Enhance resistance to DPA by disturbing the intermediate value of computed results depending on the value in effect.

In order to achieve the objectives above, the encryption processing apparatus embodying the embodiments of the present invention is designed to have the following characteristics.

In the encryption circuit, a flag register and a flag wire are provided for each group of a predetermined number of bits on the signal bus.

When given data constituted by the predetermined number of bits reaches a predetermined value, a flag is set. This flag is used for inversion control over the predetermined number of bits.

Each group of the predetermined number of bits is selected in such a manner that, of the output signals from a plurality of sub-S-boxes included in the encryption circuit, those from at least two sub-S-boxes are included in the bits.

With the above characteristics envisaged, the following arrangements are provided to fulfill the objectives <1> through <3> above:

If the number of "1" bits (HW) constitutes a majority in a give group of the predetermined number of bits, then a flag is set and the corresponding data is inverted accordingly.

With regard to the objective <1> above, a flag register and a flag wire are added. If the HW fails to reach a majority and if the HW is 4, then an additional flag is set and the flag wire in question is charged. In other words, the additional flag is set when the Hamming weight is 0, 1, or 4.

Flag data is generated in accordance with the bit pattern of the predetermined number of bits. A flag (FLG) constituted by the generated flag data is used for data inversion control.

In each of the first through the fifth embodiments to be discussed below, one round of operation cycles is formed by a pre-charge phase and an evaluation phase. DES encryption is provided by 16 rounds of operations.

<1. First Embodiment>

Figure 1:
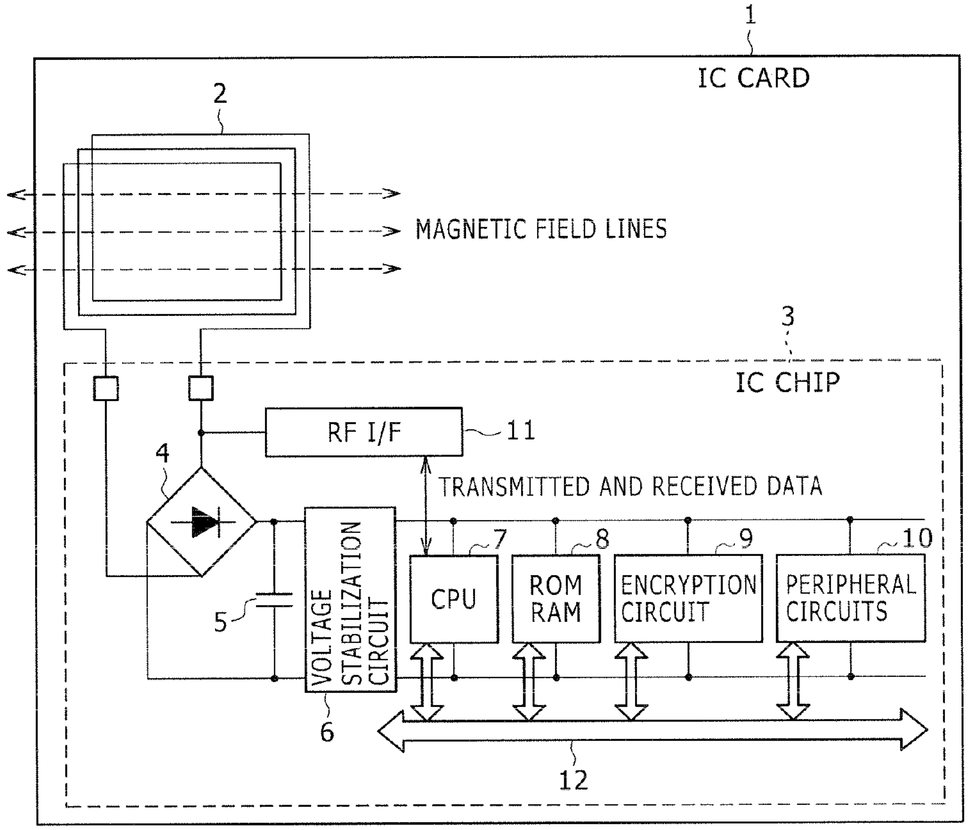
FIG. 1 is a schematic view showing a typical structure of an IC card having general encryption capabilities.
Figure 2:
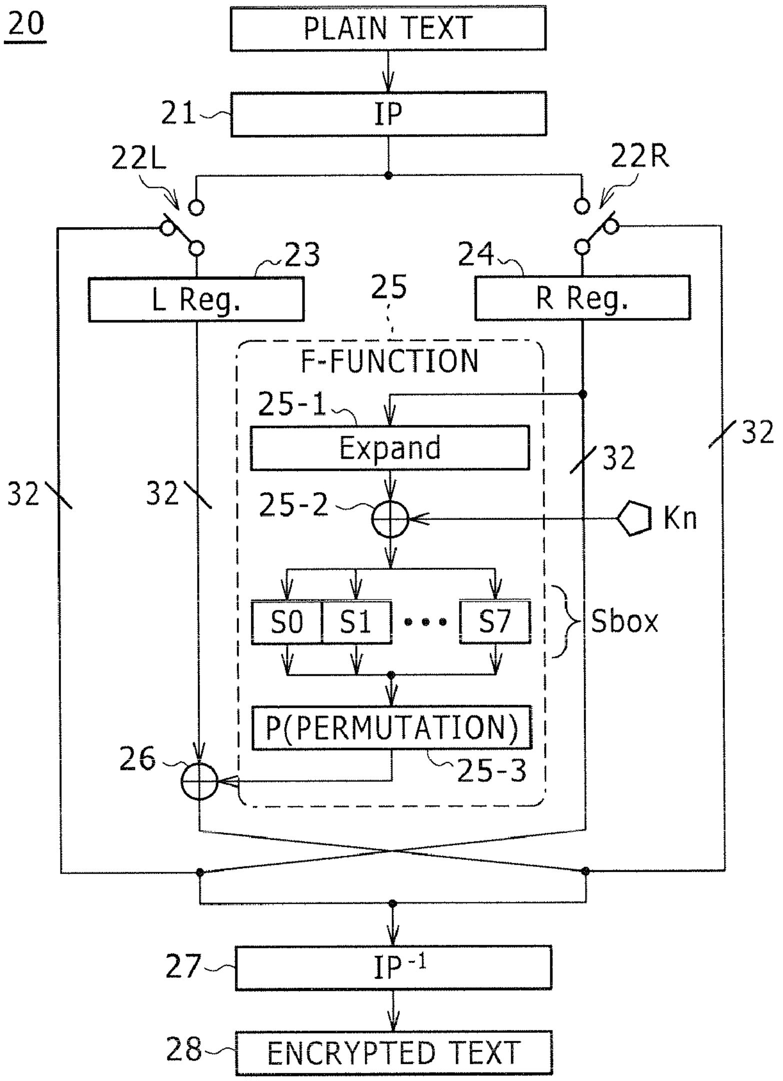
FIG. 2 is a schematic view showing the general structure of a DES operation circuit as a typical encryption circuit.
Figure 3:
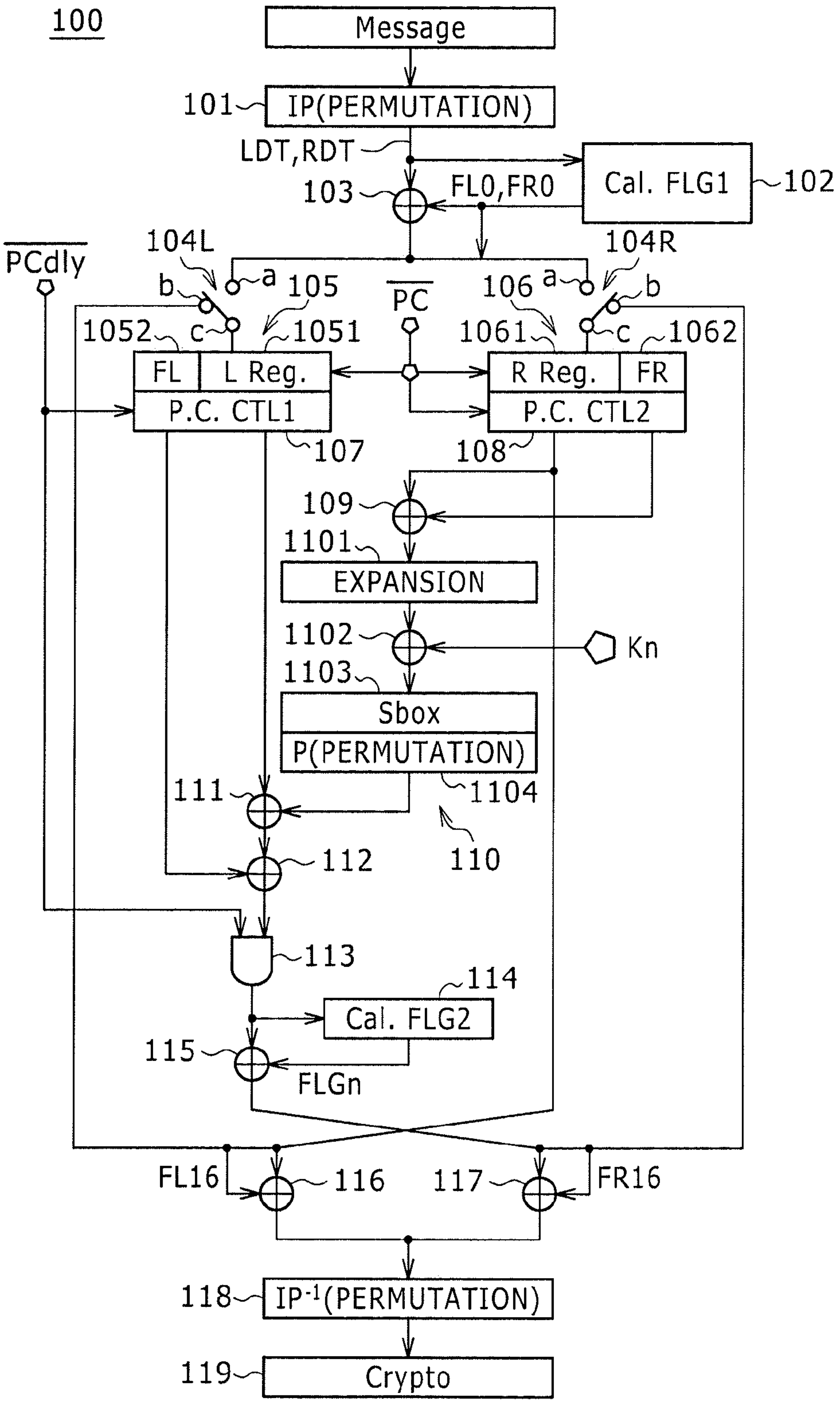
FIG. 3 is a schematic view partially showing a typical structure of the DES operation circuit as an encryption processing apparatus practiced as a first embodiment of the present invention.

FIG. 3 is a schematic view showing a typical structure of a DES operation circuit 100 as an encryption processing apparatus practiced as the first embodiment of the present invention. FIG. 4 is a circuit diagram partially showing a typical structure of the DES operation circuit 100 in FIG. 3.

In the DES operation circuit 100, the signal bus is divided into groups of a predetermined number of bits primarily to reduce consumed currents, as will be described later in detail. Circuits are provided to set a flag if the number of "1" bits reaches a majority in each group of the predetermined number of bits.

The flag is used for data inversion control. If the number of "1" bits in a given group of bits is a majority, then the data in question is inverted. As a result, the number of "1" bits in each group of the predetermined number of bits is kept below the majority.

The DES operation circuit 100 includes an initial permutation (IP) device 101, a first flag operation device (Cal. FLG1) 102, a first EXOR operation device 103, switches 104L and 104R, a first register device 105, and a second register device 106. The DES operation circuit 100 further includes a first pre-charge control device (P.C. CTL1) 107, a second pre-charge control device (P.C. CTL2) 108, and a second EXOR operation device 109.

Furthermore, the DES operation circuit 100 has an F-function device 110 making up a round operation device, a third EXOR operation device 111, a fourth EXOR operation device 112, an AND gate device 113, a second flag operation device (Cal. FLG2) 114, and a fifth EXOR operation device 115.

In addition, the DES operation circuit 100 includes a sixth EXOR operation device 116 and a seventh EXOR operation device 117 serving as a flag resetting device, an inverse permutation device ($IP^{-1}$) 118, and an encrypted text output device 119. The EXOR operation stands for the exclusive-OR operation.

The DES operation circuit 100 uses the following control signals.

A signal "/PC" is a signal that controls pre-charging. When brought Low, this signal causes all signal lines (load wires) of the registers to go Low. When brought High, the signal "/PC" causes the registers to output their latched values via the signal lines (load wires).

A signal "/PCdly" is a control signal obtained by delaying only the leading edge of the control signal "/PC" by the amount of a delay time of the F-function device 110. Specifically, the signal "/PCdly" is the same in what it does as the signal "/PC." The signal "/PCdly" corresponds to a first control signal and the signal "/PC" to a second control signal.

The DES operation circuit of the first embodiment is different from the corresponding ordinary structure in the following points.

The first register device 105 and the second register device 106 are each furnished with a flag register in addition to their left register (LReg) and right register (RReg) for data.

The output from the first register device 105 and the output from the second register device 106 go through logical operations in the first pre-charge control device 107 and second pre-charge control device 108 involving the pre-charge control signal "/PC," before being output onto load wires.

Right (R) register data and the corresponding flag data are input to the F-function device 110 and the left register LReg. The input to the F-function device 110 undergoes the EXOR (exclusive-OR) operation with the flag value FRn in the second EXOR operation device 109 whereby the flag is reset.

Left (L) register data is subject to the EXOR operation with the output from the F-function device 110 in the third EXOR operation device 111, before undergoing the EXOR operation with the flag FL in the fourth EXOR operation device 112 whereby the flag is reset and the data is brought to its original intermediate value.

From that value, a new flag FLGn is generated by the second flag operation device 114. The flag FLGn is subject to the EXOR operation in the EXOR operation device 115, and the result of the operation is input to the right register RReg of the second register device 106.

What follows is a more detailed description of the structures and functions of the DES operation circuit 100 in FIG. 3 having the above-described characteristics.

The initial permutation device 101 performs an initial permutation process on the plain text making up a message. Following the processing, left data LDT and right data RDT are output to the first flag operation device 102 and first EXOR operation device 103. The left data LDT and the right data RDT output from the initial permutation device 101 are 32 bits long each.

The first flag operation device 102 operates on the left data LDT and right data RDT from the initial permutation device 101 so as to generate a flag for each group of a predetermined number of bits (two bits for the first embodiment) in the data. Flags FL0 and FR0 are thus generated and are output to the first EXOR operation device 103.

The first EXOR operation device 103 performs the EXOR operation on the left data LDT and right data RDT coming from the initial permutation device 101 and on the corresponding flags FL0 and FR0. The first EXOR operation device 103 supplies the left data controlled by the flag FL0 to the first register device 105 via the switch 104L. At this point, the data of the flag FL0 is also fed to the first register device 105 through the switch 104L.

The first EXOR operation device 103 supplies the right data controlled by the flag FR0 to the second register device 106 via the switch 104R. At this point, the data of the flag FR0 is also fed to the second register device 106 through the switch 104R.

A moving contact “a” of the switch 104L is connected to the output of the first EXOR operation device 103, and a moving contact “b” of the switch 104L is connected to the output of the second pre-charge control device 108. A fixed contact “c” of the switch 104L is connected to the input of the first register device 105.

A moving contact “a” of the switch 104R is connected to the output of the first EXOR operation device 103, and a moving contact “b” of the switch 104R is connected to the output of the fifth EXOR operation device 115. A fixed contact “c” of the switch 104R is connected to the input of the second register device 106.

The first register device 105 is made up of a left register (LReg) 1051 and a flag register 1052. The left register 1051 and the flag register 1052 correspond to the first data register and the first flag register, respectively.

The left register 1051 latches the data of, say, 32 bits input through the switch 104L at a trailing edge of the control signal /PC. The flag register 1052 latches a flag FL(0, n−1) input through the switch 104L at a trailing edge of the control signal /PC.

The second register device 106 is made up of a right register (RReg) 1061 and a flag register 1062. The right register 1061 and the flag register 1062 correspond to the second data register and the second flag register, respectively.

The right register 1061 latches the data of, say, 32 bits input through the switch 104R at a trailing edge of the control signal /PC. The flag register 1062 latches a flag FR(0, n−1) input through the switch 104R at a trailing edge of the control signal /PC.

The first pre-charge control device 107 performs logical operations (AND in this example) on the data latched in the left register 1051, on the flag FLn−1 latched in the flag register 1052 and on the control signal /PCdly. The first pre-charge control device 107 outputs the data having undergone the logical operations to one of the inputs of the third EXOR operation device 111 and feeds the flag FLn−1 having gone through the logical operations to one of the inputs of the fourth EXOR operation device 115.

A typical structure of the first pre-charge control device 107 is explained below in reference to FIG. 4. As shown in FIG. 4, the first pre-charge control device 107 includes two-input AND gates ADL00 through ADL031 for data and two-input AND gates AFL00 through AFL015 for flags. The first pre-charge control device 107 also includes load wires LDL00 through LDL031 for data, and load wires LFL00 through LFL015 for flags.

The AND gates ADL00 through ADL031 for data perform the AND operations on each of the bit data 0*b* through b31 constituting 32-bit data (Ln−1±FLn−1) latched in the left register 1051 and on the control signal /PCdly. The symbol ± stands for the exclusive-OR operation. The AND gates ADL00 through ADL031 output the results of the operations to the load wires LDL00 through LDL031 for data which are furnished in a manner corresponding to the AND gate outputs.

The AND gates AFL00 through AFL015 for flags perform the AND operations on each of 16 flags FLn−1[0] through FLn−1[15] latched in the flag register 1052 and on the control signal /PCdly. The AND gates AFL00 through AFL015 output the results of the operations to the load wires LFL00 through LFL015 for flags which are furnished in a manner corresponding to the AND gate outputs.

When supplied with the control signal /PCdly being Low, the first pre-charge control device 107 brings the outputs of all AND gates ADL00 through ADL031 and AFL00 through AFL015 Low. That is, when the control signal /PCdly is Low, the latched values in the left register 1051 and flag register 1052 of the first register device 105 are not output.

When supplied with the control signal /PCdly being High, the first pre-charge control device 107 causes all AND gates ADL00 through ADL031 and AFL00 through AFL015 to perform their AND operations. The latched values in the left register 1051 and flag register 1052 are thus output.

The second pre-charge control device 108 performs logical operations (AND in this example) on the data latched in the right register 1061, on the flag FRn−1 latched in the flag register 1062 and on the control signal /PC. The second pre-charge control device 108 outputs the data having undergone the logical operations to one of the inputs of the second EXOR operation device 109 and feeds the flag FRn−1 having gone through the logical operations to the other input of the second EXOR operation device 109.

A typical structure of the second pre-charge control device 108 is explained below in reference to FIG. 4. As shown in FIG. 4, the second pre-charge control device 108 has two-input AND gates ADR00 through ADR031 for data and two-input AND gates AFR00 through AFR015 for flags. The second pre-charge control device 108 further includes load wires LDR00 through LDR031 for data and load wires LFR00 through LFR015 for flags.

The AND gates ADR00 through ADR031 for data perform the AND operations on each of the bit data b0 through b31 of 32-bit data (Rn−1±FRn−1) latched in the right register 1061 and on the control signal /PC. The symbol ± stands for the exclusive-OR operation. The AND gates ADR00 through ADR031 output the results of the operations to the load wires LDR00 through LDR031 for data which are furnished in a manner corresponding to the AND gate outputs.

The AND gates AFR00 through AFR015 for flags perform the AND operations on each of 16 flags FRn−1[0] through FRn−1[15] latched in the flag register 1062 and on the control signal /PC. The AND gates AFR00 through AFR015 output the results of the operations to the load wires LFR00 through LFR015 for flags which are furnished in a manner corresponding to the AND gate outputs.

When supplied with the control signal /PC being Low, the second pre-charge control device 108 brings the outputs of all AND gates ADR00 through ADR031 and AFR00 through AFR015 Low. That is, when the control signal /PC is Low, the latched values in the right register 1061 and flag register 1062 of the second register device 106 are not output.

When supplied with the control signal /PC being High, the second pre-charge control device 108 causes all AND gates ADR00 through ADR031 and AFR00 through AFR015 to perform their AND operations. The latched values in the right register 1061 and flag register 1062 are thus output.

The second EXOR operation device 109 performs the EXOR operations on each of the bit data b0 through b31 constituting the data latched in the right register 1061 and output from the second pre-charge control device 108 and on the latched flags FRn−1[0] through FRn−1[15] in the flag register 1062. The second EXOR operation device 109 resets the flags temporarily through the EXOR operations on the data and flag values and outputs the resulting data to the F-function device 110.

A typical structure of the second EXOR operation device 109 is explained below in reference to FIG. 4. As shown in FIG. 4, the second EXOR operation device 109 has 32 EXOR operators EOR20 through EOR231 arranged in parallel with the output of the second pre-charge control device 108.

One of the inputs of the EXOR operator EOR20 is connected to the load wire LDR00 for data, and the other input of the EXOR operator EOR20 is connected to the load wire LFR00 for flags. The EXOR operator EOR20 performs the EXOR operation on the bit data b0 and on the flag FRn−1[0].

One of the inputs of the EXOR operator EOR21 is connected to the load wire LDR01 for data, and the other input of the EXOR operator EOR21 is connected to the load wire LFR00 for flags. The EXOR operator EOR21 performs the EXOR operation on the bit data b1 and on the flag FRn−1[0].

One of the inputs of the EXOR operator EOR22 is connected to the load wire LDR02 for data, and the other input of the EXOR operator EOR22 is connected to the load wire LFR01 for flags. The EXOR operator EOR22 performs the EXOR operation on the bit data b2 and on the flag FRn−1[1].

One of the inputs of the EXOR operator EOR23 is connected to the load wire LDR03 for data, and the other input of the EXOR operator EOR23 is connected to the load wire LFR01 for flags. The EXOR operator EOR23 performs the EXOR operation on the bit data b3 and on the flag FRn−1[1].

In like manner, one of the inputs of the EXOR operator EOR230 is connected to the load wire LDR030 for data, and the other input of the EXOR operator EOR230 is connected to the load wire LFR15 for flags. The EXOR operator EOR230 performs the EXOR operation on the bit data b30 and on the flag FRn−1[15].

One of the inputs of the EXOR operator EOR231 is connected to the load wire LDR031 for data, and the other input of the EXOR operator EOR231 is connected to the load wire LFR15 for flags. The EXOR operator EOR231 performs the EXOR operation on the bit data b31 and on the flag FRn−1 [15].

As described above, the second EXOR operation device 109 performs its EXOR operations on each of two consecutive bits using the same flag FRn−1[0-15].

The F-function device 110 performs an F-function operation using a key Kn on the data of which the flags were reset by the second EXOR operation device 109. A typical structure of the F-function device 110 is explained below in reference to FIGS. 3 and 4. As shown in FIGS. 3 and 4, the F-function device 110 has an expansion device 1101, an eighth EXOR operation device 1102, an S-box device 1103, and a permutation device 1104.

The expansion device 1101 expands (i.e., performs a bit expansion process on) the 32-bit data of which the flags were reset by the second EXOR operation device 109. After expanding the 32-bit data into 48-bit data, the expansion device 1101 supplies the EXOR operation device 1102 with the expanded data in successive groups of 6 bits.

The eighth EXOR operation device 1102 performs the EXOR (exclusive-OR) operation on the output data from the expansion device 1101 and on a round key Kn (having the same number of bits as that of the expanded bits). The result of the operation is output from the eighth EXOR operation device 1102 to the S-box device 1103.

The EXOR operation device 1102 in FIG. 4 includes EXOR operators EOR60 through EOR67. The EXOR operator EOR60 performs the EXOR operation on the expanded data EPD0 from the expansion device 1101 and on key data k0 through k5. The result of the operation is output from the EXOR operator EOR60 to an S-box $S_0$ in the S-box device 1103.

The EXOR operator EOR61 performs the EXOR operation on the expanded data EPD1 from the expansion device 1101 and on key data k6 through k11. The result of the operation is output from the EXOR operator EOR61 to an S-box $S_1$ in the S-box device 1103.

The EXOR operator EOR62 performs the EXOR operation on the expanded data EPD2 from the expansion device 1101 and on key data k12 through k17. The result of the operation is output from the EXOR operator EOR62 to the S-box $S_2$ in the S-box device 1103.

In like manner, the EXOR operator EOR66 performs the EXOR operation on the expanded data EPD6 from the expansion device 1101 and on key data k36 through k41. The result of the operation is output from the EXOR operator EOR66 to an S-box $S_6$ in the S-box device 1103.

The EXOR operator EOR67 performs the EXOR operation on the expanded data EPD7 from the expansion device 1101 and on key data k42 through k47. The result of the operation is output from the EXOR operator EOR67 to an S-box $S_7$ in the S-box device 1103.

The S-box device 1103 performs nonlinear conversion processes on the results of the operations performed by the eighth EXOR operation device 1102. Illustratively, the S-box device 1103 carries out nonlinear processing converting the target data from 48 bits to 32 bits using a translation table.

The S-box device 1103 includes a plurality of (8, in FIG. 4) S-boxes $S_0$ through $S_7$ that perform nonlinear processes. Each of the S-boxes $S_0$ through $S_7$ performs nonlinear processing for conversion from 6 to 4 bits using the translation table. The output bits (4×8=32 bits) from the S-boxes $S_0$ through $S_7$ are input to the permutation device 1104.

The permutation device 1104 permutates the bit positions of the output data from the S-box device 1103. The results of the permutation are output as 32-bit data PD0 through PD31 from the permutation device 1104 to the third EXOR operation device 111.

The third EXOR operation device 111 performs the EXOR operation on the output data from the F-function device 110 and on the data latched in the left register 1051 and output from the first pre-charge control device 107. The result of the operation is output from the third EXOR operation device 111 to the fourth EXOR operation device 112.

A typical structure of the third EXOR operation device 111 is explained below in reference to FIG. 4. As shown in FIG. 4, the third EXOR operation device 111 includes 32 EXOR operators EOR30 through EOR331 arranged in parallel with the output of the first pre-charge control device 107.

One of the inputs of the EXOR operator EOR30 is connected to the load wire LDL00 for data, and the other input of the EXOR operator EOR30 is connected to the supply line for data PD0 of the F-function device 110. The EXOR operator EOR30 performs the EXOR operation on the bit data b0 in the left register 1051 and on the data PD0.

One of the inputs of the EXOR operator EOR31 is connected to the load wire LDL01 for data, and the other input of the EXOR operator EOR31 is connected to the supply line for data PD1 of the F-function device 110. The EXOR operator EOR31 performs the EXOR operation on the bit data b1 in the left register 1051 and on the data PD1.

In like manner, one of the inputs of the EXOR operator EOR330 is connected to the load wire LDL030 for data, and the other input of the EXOR operator EOR330 is connected to the supply line for data PD30 of the F-function device 110. The EXOR operator EOR330 performs the EXOR operation on the bit data b30 in the left register 1051 and on the data PD30.

One of the inputs of the EXOR operator EOR331 is connected to the load wire LDL031 for data, and the other input of the EXOR operator EOR331 is connected to the supply line for data PD31 of the F-function device 110. The EXOR operator EOR331 performs the EXOR operation on the bit data b31 in the left register 1051 and on the data PD31.

The fourth EXOR operation device 112 performs the EXOR operations on the results of the operations performed by the EXOR operators EOR30 through EOR331 in the third EXOR operation device 111 and on the latched flags FLn−1 [0] through FLn−1[15] in the flag register 1052. The fourth EXOR operation device 112 resets the flags temporarily through the EXOR operations on the data and flag values and outputs the resulting data as intermediate values to the AND gate device 113.

A typical structure of the fourth EXOR operation device 112 is explained below in reference to FIG. 4. As shown in FIG. 4, the fourth EXOR operation device 112 has 32 EXOR operators EOR40 through EOR431 arranged in parallel with the output of the third EXOR operation device 111.

One of the inputs of the EXOR operator EOR40 is connected to the output of the EXOR operator EOR30 in the third EXOR operation device 111, and the other input of the EXOR operator EOR40 is connected to the load wire LFL00 for flags. The EXOR operator EOR40 performs the EXOR operation on the output data from the EXOR operator EOR30 and on the flag FLn−1[0].

One of the inputs of the EXOR operator EOR41 is connected to the output of the EXOR operator EOR31 in the third EXOR operation device 111, and the other input of the EXOR operator EOR41 is connected to the load wire LFL00 for flags. The EXOR operator EOR41 performs the EXOR operation on the output data from the EXOR operator EOR31 and on the flag FLn−1[0].

One of the inputs of the EXOR operator EOR42 is connected to the output of the EXOR operator EOR32 in the third EXOR operation device 111, and the other input of the EXOR operator EOR42 is connected to the load wire LFL01 for flags. The EXOR operator EOR42 performs the EXOR operation on the output data from the EXOR operator EOR32 and on the flag FLn−1[1].

One of the inputs of the EXOR operator EOR43 is connected to the output of the EXOR operator EOR33 in the third EXOR operation device 111, and the other input of the EXOR operator EOR43 is connected to the load wire LFL01 for flags. The EXOR operator EOR43 performs the EXOR operation on the output data from the EXOR operator EOR33 and on the flag FLn−1[1].

In like manner, one of the inputs of the EXOR operator EOR430 is connected to the output of the EXOR operator EOR330 in the third EXOR operation device 111, and the other input of the EXOR operator EOR430 is connected to the load wire LFL015 for flags. The EXOR operator EOR430 performs the EXOR operation on the output data from the EXOR operator EOR330 and on the flag FLn−1[15].

One of the inputs of the EXOR operator EOR431 is connected to the output of the EXOR operator EOR331 in the third EXOR operation device 111, and the other input of the EXOR operator EOR431 is connected to the load wire LFL015 for flags. The EXOR operator EOR431 performs the EXOR operation on the output data from the EXOR operator EOR331 and on the flag FLn−1[15].

As described above, the fourth EXOR operation device 112 performs the EXOR operations on each of two consecutive bits using the same flag FRn−1[0-15].

The AND gate device 113 performs the AND operations on each of the EXOR operators EOR40 through EOR431 in the fourth EXOR operation device 112 and on the control signal /PCdly. The results of the operations are output from the AND gate device 113 to the second flag operation device 114 and fifth EXOR operation device 115.

A typical structure of the AND gate device 113 is explained below in reference to FIG. 4. The AND gate device 113 includes 32 AND gates AD00 through AD031.

The AND gate AD00 performs the AND operation on the output data from the EXOR operator EOR40 in the fourth EXOR operation device 112 and on the control signal /PCdly.

The AND gate AD01 performs the AND operation on the output data from the EXOR operator EOR41 in the fourth EXOR operation device 112 and on the control signal /PCdly.

The AND gate AD02 performs the AND operation on the output data from the EXOR operator EOR42 in the fourth EXOR operation device 112 and on the control signal /PCdly.

The AND gate AD03 performs the AND operation on the output data from the EXOR operator EOR43 in the fourth EXOR operation device 112 and on the control signal /PCdly.

In like manner, the AND gate AD030 performs the AND operation on the output data from the EXOR operator EOR430 in the fourth EXOR operation device 112 and on the control signal /PCdly.

The AND gate AD031 performs the AND operation on the output data from the EXOR operator EOR431 in the fourth EXOR operation device 112 and on the control signal /PCdly.

The second flag operation device 114 newly generates flags FRn[0] through FRn[15] from the intermediate value data which are supplied via the AND gate device 113 and of which the flags were reset by the fourth EXOR operation device 112. The newly generated flags are output from the second flag operation device 114 to the fifth EXOR operation device 115. In FIG. 3, the flags fed to the fifth EXOR operation device 115 are indicated by reference character FLGn. The flags FRn[0] through FRn[15] generated by the second flag operation device 114 become update values of the flag register 1062 in the second register device 106.

A typical structure of the second flag operation device 114 is explained below in reference to FIG. 4. The second flag operation device 11 includes 16 AND gates AD10 through AD115.

The AND gate AD10 in the second flag operation device 114 performs the AND operation on the outputs from the AND gates AD00 and AD01 in the AND gate device 113. The result of the operation is output as a flag FRn[0].

The AND gate AD11 in the second flag operation device 114 performs the AND operation on the outputs from the AND gates AD02 and AD03 in the AND gate device 113. The result of the operation is output as a flag FRn[1].

In like manner, the AND gate AD115 in the second flag operation device 114 performs the AND operation on the outputs from the AND gates AD030 and AD031 in the AND gate device 113. The result of the operation is output as a flag FRn[15].

The fifth EXOR operation device 115 performs the EXOR operations on the operation results coming from the EXOR operators EOR40 through EOR431 in the fourth EXOR operation device 112 via the AND gate device 113 and on the flags FRn[0] through FRn[15] generated by the second flag operation device 114. Data b0' through b31' resulting from the operations performed by the fifth EXOR operation device 115 become update data in the right register 1061 of the second register device 106.

A typical structure of the fifth EXOR operation device 115 is explained below in reference to FIG. 4. As shown in FIG. 4, the fifth EXOR operation device 115 has 32 EXOR operators EOR50 through EOR531 arranged in parallel with the output of the AND gate device 113.

One of the inputs of the EXOR operator EOR50 is connected to the output of the AND gate AD00 in the AND gate device 113, and the other input of the EXOR operator EOR50 is connected to the output line of the flag FRn[0]. The EXOR operator EOR50 performs the EXOR operation on the data output from the EXOR operator EOR40 via the AND gate AD00 and on the flag FRn[0].

One of the inputs of the EXOR operator EOR51 is connected to the output of the AND gate AD01 in the AND gate device 113, and the other input of the EXOR operator EOR51 is connected to the output line of the flag FRn[0]. The EXOR operator EOR51 performs the EXOR operation on the data output from the EXOR operator EOR41 via the AND gate AD01 and on the flag FRn[0].

One of the inputs of the EXOR operator EOR52 is connected to the output of the AND gate AD02 in the AND gate device 113, and the other input of the EXOR operator EOR52 is connected to the output line of the flag FRn[1]. The EXOR operator EOR52 performs the EXOR operation on the data output from the EXOR operator EOR42 via the AND gate AD02 and on the flag FRn[1].

One of the inputs of the EXOR operator EOR53 is connected to the output of the AND gate AD03 in the AND gate device 113, and the other input of the EXOR operator EOR53 is connected to the output line of the flag FRn[1]. The EXOR operator EOR53 performs the EXOR operation on the data output from the EXOR operator EOR43 via the AND gate AD03 and on the flag FRn[1].

In like manner, one of the inputs of the EXOR operator EOR530 is connected to the output of the AND gate AD030 in the AND gate device 113, and the other input of the EXOR operator EOR530 is connected to the output line of the flag FRn[15]. The EXOR operator EOR530 performs the EXOR operation on the data output from the EXOR operator EOR430 via the AND gate AD030 and on the flag FRn[15].

One of the inputs of the EXOR operator EOR531 is connected to the output of the AND gate AD031 in the AND gate device 113, and the other input of the EXOR operator EOR531 is connected to the output line of the flag FRn[15]. The EXOR operator EOR531 performs the EXOR operation on the data output from the EXOR operator EOR431 via the AND gate AD031 and on the flag FRn[15].

As described above, the fifth EXOR operation device 115 performs its EXOR operations on each of two consecutive bits using the same flag FRn[1-15].

The sixth EXOR operation device 116 performs the EXOR operation on the data having undergone a round operation and on a flag FL16. The data of which the flag was thus reset is output from the sixth EXOR operation device 116 to the inverse permutation device 118.

The seventh EXOR operation device 117 performs the EXOR operation on the data having gone through a round operation and on a flag FR16. The data of which the flag was thus reset is output from the seventh EXOR operation device 117 to the inverse permutation device 118.

The inverse permutation device 118 carries out inverse permutation ($IP^{-1}$) of the data whose flags were reset. The resulting data is output from the inverse permutation device 118 as an encrypted text via the encrypted text output device 119.

Figure 5:
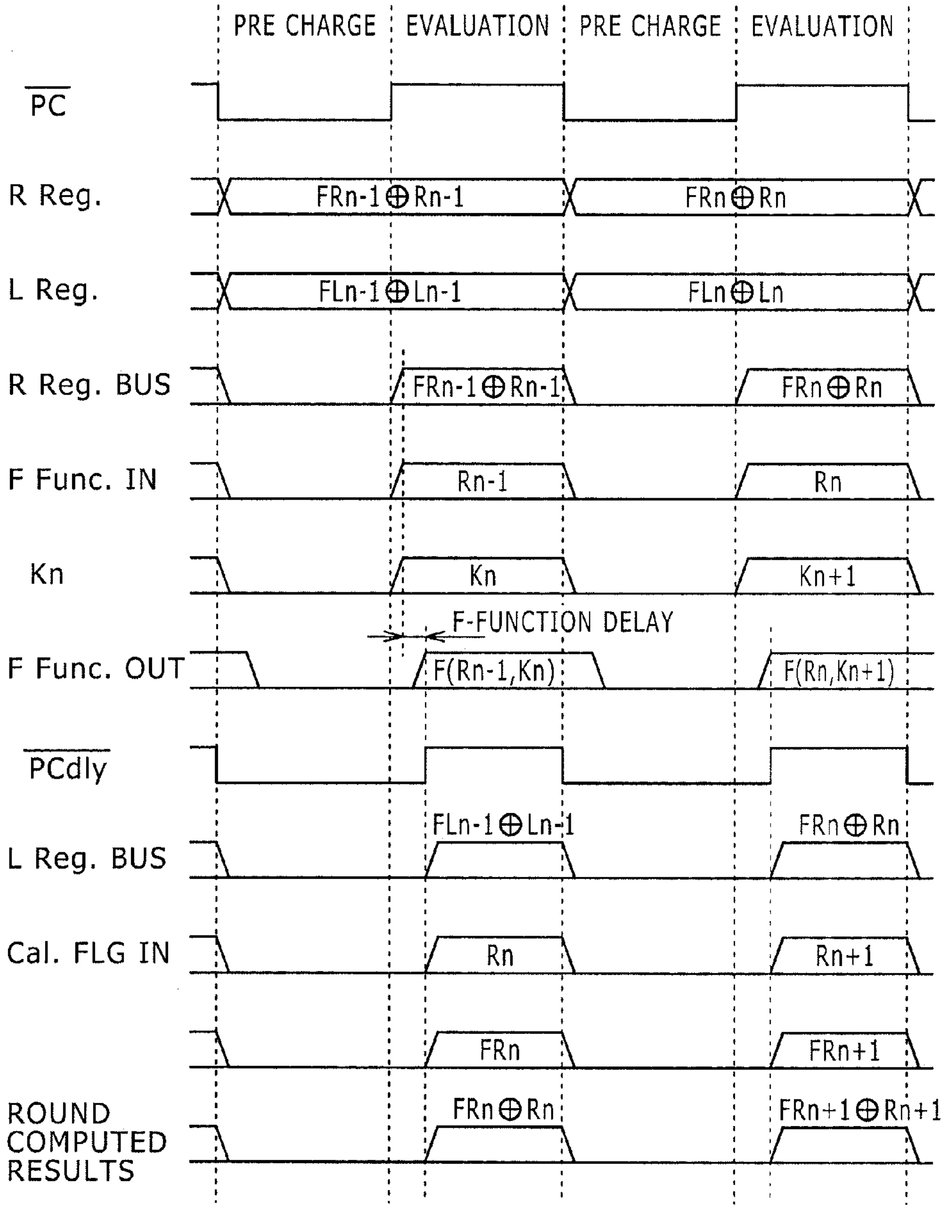
FIG. 5 is a timing chart explanatory of how the DES operation circuit as the first embodiment typically operates.
Figure 6:
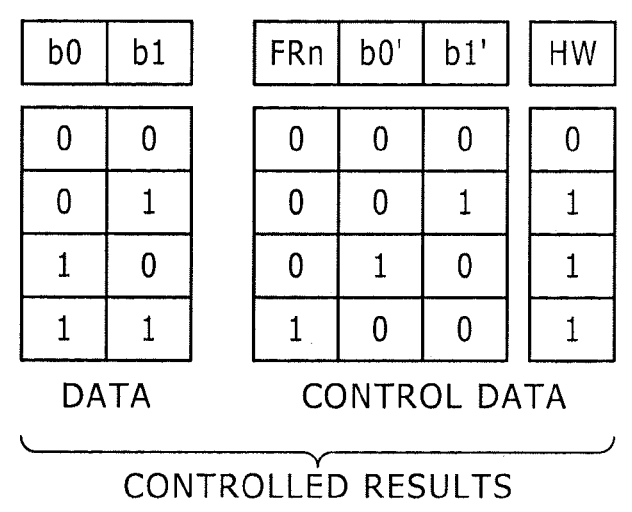

Described below in reference to FIGS. 5 and 6 is the encryption operation performed by the DES operation circuit as the first embodiment of this invention. FIG. 5 is a timing chart explanatory of how the DES operation circuit as the first embodiment typically operates. FIG. 6 is a schematic view showing relations between two-bit data and controlled data with regard to the DES operation circuit as the first embodiment.

A plain text input as data first undergoes initial permutation in the initial permutation device 101 before being split into left data LDT and right data RDT. The first flag operation device 102 performs flag operations on the data in groups of a predetermined number of bits. The resulting data are subject to flag control by the first EXOR operation device 103 before being latched in the first and the second register devices 105 and 106 together with the flag data. In this example, the first flag operation device 102 performs the flag operations on the data in groups of two bits.

As shown in FIG. 6, flag control involves having a flag FLG(FRn) set to “1” only if two-bit data (b0, b1) take the values of (1, 1). The data is inverted given the flag value. The data b0' and b1' having undergone flag control both take the value “0.” The Hamming weight (HW), which is the number of “1” bits, is then kept at 1 or less including the flag.

In the other three cases of FIG. 6, the flag FLG(FRn) is set to “0,” which means the HW is kept at 1 or less including the flag. As a result, the HW subsequent to control in groups of two bits is kept at 1 or less including the flag. It follows that whereas the left data and the right data are 32 bits long each, the HW of the values latched in the left register 1051 and right register 1061 is kept at 16 bits or less including the flag registers 1052 and 1062.

The encryption operation involves having one round operation carried out in two cycles composed of a pre-charge phase and an evaluation phase. Two control signals are used: the control signal /PC that goes Low in the pre-charge phase and is brought High in the evaluation phase, and the control signal /PCdly obtained by delaying a rising edge of the control signal /PC by the amount of a delay time of the F-function device 110.

Suppose that in a round “n,” the original data are “Ln−1” and “Rn−1” and the flag values are “FLn−1” and “FRn−1.” In that case, the data latched in the left register 1051 and right register 1061 are “FLn−1±Ln−1” and “FRn−1±Rn−1,” respectively.

In the pre-charge phase, the control signals /PC and /PCdly are brought Low, so that the data and flags on the register output wires as well as the inputs to the second flag operation device 114 are all set to "0." It is assumed that during this period, an output "Kn" from a round key generation circuit is at the "0" level and so is the output from the F-function device 110.

In the evaluation phase that comes next, the control signal /PC is brought High so that the round operation is performed. Because the signal /PC goes High when the evaluation phase is reached, the value latched in the right register 1061 and the flag value in the flag register 1062 are input to the F-function device 110 and first register device 105.

At this point, under control using flag values, the number of bits set to "1" on the output signal wires of the right register 106 is kept at 16 or less. Upstream of the input of the F-function device 110, the value latched in the right register 1061 is subjected to the EXOR operation with the flag value and thereby brought back to the original value "Rn−1." The value "Rn−1" is input to the F-function device 110 for an F-function operation. Upon elapse of the time of the operation performed by the F-function device 110, the result of the operation is output from the F-function device 110. At about the same time, the control signal /PCdly is brought High.

The data latched in the left register 1051 is output onto the signal wiring at a rising edge of the control signal /PCdly. At this point, the number of bits set to "1" is kept at 16 or less.

The data "FLn−1±Ln−1" latched in the left register 1051 is input to the third EXOR operation device 111. There, the input data is exclusive-OR'ed with the output from the F-function device 110.

The result of the exclusive-OR operation is "FLn−1±Ln−1±F(Rn−1,Kn)=FLn−1±Rn." However, since the flag "FLn−1" is not the flag for the data "Rn," the number of bits set to "1" on the output wires of the third EXOR operation device 111 is not necessarily kept at 16 or less.

Thereafter, the data is exclusive-OR'ed with the flag "FLn−1" in the fourth EXOR operation device 112 whereby the flag is reset and the operation result "Rn" is obtained. This value, too, is not subject to control, so that the number of bits set to "1" on the output wires of the fourth EXOR operation device 112 is not kept at 16 or less.

The same holds for the output from the AND gate device 113, i.e., for the result of the AND operation on the above signal and on the control signal /PCdly. Thus in order to reduce the charging and discharging currents of the signal wiring, it is preferred to keep close to one another the computing elements of the paths ranging from the third EXOR operation device 111 to the fifth EXOR operation device 115.

At a rising edge of the control signal /PCdly, the output of the AND gate device 113 becomes active. The operation result "Rn" is then input to the second flag operation device 114 and a new flag value is generated thereby.

The flag value thus generated is used by the fifth EXOR operation device 115 for data inversion control. The data of which the number of bits set to "1" is kept at 16 or less is then output and sent to the right register 1061.

The second flag operation device 114 for two-bit control is an AND circuit as shown in FIG. 4. Only when two bits are both "1," is the flag set to "1" to invert the data to "0" each. With the other data, the flag value is set to "0" but the number of bits set to "1" in two-bit data is 1 or less.

Following the above operations, the number of bits set to "1" is kept at 16 or less including the flags in the output from the right register in the next round. At the end of the round operation, the final data is exclusive-OR'ed with the flag value and thereby brought back to the original value. After inverse permutation, the data is output as the result of the operation.

According to the first embodiment for two-bit control, as described above, the HW of the signal lines including the flags is kept less than half the bus width so that power consumption is reduced appreciably.

<2. Second Embodiment>

Figure 7:
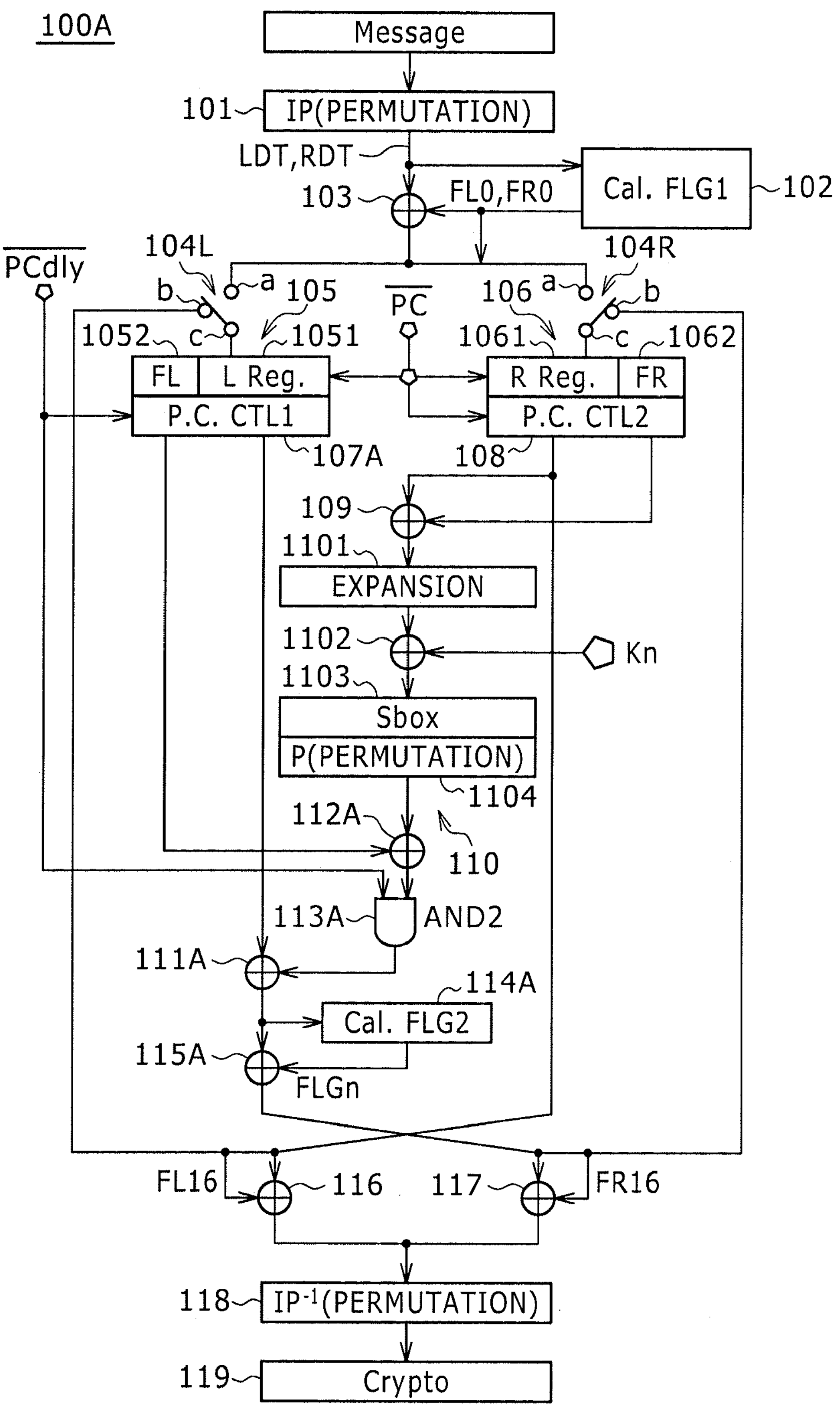
FIG. 7 is a schematic view showing a typical structure of a DES operation circuit as an encryption processing device practiced as a second embodiment of the present invention.

The second embodiment of the present invention will now be described. FIG. 7 is a schematic view showing a typical structure of a DES operation circuit 100A as an encryption processing device practiced as the second embodiment of the present invention. FIG. 8 is a circuit diagram partially showing a typical structure of the DES operation circuit 100A in FIG. 7. In FIGS. 7 and 8, the components that are structurally and functionally equivalent to those in FIGS. 3 and 4 are designated by like reference characters for purpose of simplification and illustration.

The DES operation circuit 100A as the second embodiment is different from the DES operation circuit as the first embodiment shown in FIGS. 3 and 4 in this: that the DES operation circuit 100A is structured as a circuit to reduce the charging and discharging currents on the bus under inversion control in groups of not two bits but four bits.

More specifically, the DES operation circuit 100A differs from the DES operation circuit 100 in the following circuit structures:

The DES operation circuit 100 in FIGS. 3 and 4 performs the EXOR operation on the value latched in the left register 1051 and on the F-function value, before carrying out the EXOR operation on the result of the preceding operation and on the value in the flag register 1052. By contrast, the DES operation circuit 100A has a fourth EXOR operation device 112A performing the EXOR operation on the output from the F-function device 110 and on the value in the flag register 1052, before getting a third EXOR operation device 111A to carry out the EXOR operation on the result of the preceding operation and on the value in the left register 1051.

In order to realize the above arrangements, an AND gate device 113A whose counterpart is positioned immediately upstream of the input of the second flag operation device 114 in the first embodiment is relocated to the output side of the F-function device 110 in the second embodiment.

With the second embodiment, the HW of the values latched in the registers is controlled in such a manner as to reduce the charging and discharging currents on the signal path. This control arrangement is not applied to the data that subsequently undergoes the logical operations performed by logical circuits with other data. It is assumed that the signal paths for the latter arrangement are laid out to be minimal in scale.

Thus the signal wires under heavy load on the side of the left register 1051 are the paths which range from the output of the left register to the first EXOR operation device and which are under HW control. The HW of the data on the other paths is not controlled.

However, the load wires of the second embodiment are arranged to be laid out in compact fashion so that their capacity will be minimized. For this reason, the difference in the effectiveness in reducing currents is negligible between the structure of FIG. 3 and that of FIG. 7.

The structure of FIG. 7 on the side of the right register 1061 works in the same manner as the structure of FIG. 3 controlled in groups of two bits. The only difference lies in the number of bits constituting each bit group to be controlled and in the number of flags involved. The controlled data and the flag are exclusive-OR'ed immediately upstream of the F-function whereby the flag is reset.

The values latched in the registers in the round "n" are subject to inversion control based on the flag value that is operated on upstream or downstream of initial permutation, in such a manner that the HW is kept at 2 or less in groups of four bits. This control method will be discussed later in more detail.

Typical structures and functions of the major components shown in FIG. 8 are explained below. In the description that follows, the components equivalent to those appearing in FIG. 4 will be designated by like reference characters. As shown in FIG. 8, a first pre-charge control device 107A of the second embodiment has eight AND gates AFL00 through AFL07 as AND gates for flags.

The fourth EXOR operation device 112A performs the EXOR operations on the output data PD0 through PD31 from the F-function device 110 and on the latched flags FLn−1[0] through FLn−1[7] in the flag register 1052.

A typical structure of the fourth EXOR operation device 112A is explained below in reference to FIG. 8. As shown in FIG. 8, the fourth EXOR operation device 112A has 32 EXOR operators EOR40 through EOR431 arranged in parallel with the output of the F-function device 110.

One of the inputs of the EXOR operator EOR40 is connected to the supply line for the data PD0 of the F-function device 110, and the other input of the EXOR operator EOR40 is connected to the load wire LFL00 for flags. The EXOR operator EOR40 performs the EXOR operation on the output data PD0 from the F-function device 110 and on the flag FLn−1[0].

One of the inputs of the EXOR operator EOR41 is connected to the supply line for the data PD1 of the F-function device 110, and the other input of the EXOR operator EOR41 is connected to the load wire LFL00 for flags. The EXOR operator EOR41 performs the EXOR operation on the output data PD1 from the F-function device 110 and on the flag FLn−1[0].

One of the inputs of the EXOR operator EOR42 is connected to the supply line for the data PD2 of the F-function device 110, and the other input of the EXOR operator EOR42 is connected to the load wire LFL00 for flags. The EXOR operator EOR42 performs the EXOR operation on the output data PD2 from the F-function device 110 and on the flag FLn−1[0].

One of the inputs of the EXOR operator EOR43 is connected to the supply line for the data PD3 of the F-function device 110, and the other input of the EXOR operator EOR43 is connected to the load wire LFL00 for flags. The EXOR operator EOR43 performs the EXOR operation on the output data PD3 from the F-function device 110 and on the flag FLn−1[0].

One of the inputs of the EXOR operator EOR44 is connected to the supply line for the data PD4 of the F-function device 110, and the other input of the EXOR operator EOR44 is connected to the load wire LFL01 for flags. The EXOR operator EOR44 performs the EXOR operation on the output data PD4 from the F-function device 110 and on the flag FLn−1[1].

One of the inputs of the EXOR operator EOR45 is connected to the supply line for the data PD5 of the F-function device 110, and the other input of the EXOR operator EOR45 is connected to the load wire LFL01 for flags. The EXOR operator EOR45 performs the EXOR operation on the output data PD5 from the F-function device 110 and on the flag FLn−1[1].

One of the inputs of the EXOR operator EOR46 is connected to the supply line for the data PD6 of the F-function device 110, and the other input of the EXOR operator EOR46 is connected to the load wire LFL01 for flags. The EXOR operator EOR46 performs the EXOR operation on the output data PD6 from the F-function device 110 and on the flag FLn−1[1].

One of the inputs of the EXOR operator EOR47 is connected to the supply line for the data PD7 of the F-function device 110, and the other input of the EXOR operator EOR47 is connected to the load wire LFL01 for flags. The EXOR operator EOR47 performs the EXOR operation on the output data PD7 from the F-function device 110 and on the flag FLn−1[1].

In like manner, one of the inputs of the EXOR operator EOR428 is connected to the supply line for the data PD28 of the F-function device 110, and the other input of the EXOR operator EOR428 is connected to the load wire LFL07 for flags. The EXOR operator EOR428 performs the EXOR operation on the output data PD28 from the F-function device 110 and on the flag FLn−1[7].

One of the inputs of the EXOR operator EOR429 is connected to the supply line for the data PD29 of the F-function device 110, and the other input of the EXOR operator EOR429 is connected to the load wire LFL07 for flags. The EXOR operator EOR429 performs the EXOR operation on the output data PD29 from the F-function device 110 and on the flag FLn−1[7].

One of the inputs of the EXOR operator EOR430 is connected to the supply line for the data PD30 of the F-function device 110, and the other input of the EXOR operator EOR430 is connected to the load wire LFL030 for flags. The EXOR operator EOR430 performs the EXOR operation on the output data PD30 from the F-function device 110 and on the flag FLn−1[7].

One of the inputs of the EXOR operator EOR431 is connected to the supply line for the data PD31 of the F-function device 110, and the other input of the EXOR operator EOR431 is connected to the load wire LFL031 for flags. The EXOR operator EOR431 performs the EXOR operation on the output data PD31 from the F-function device 110 and on the flag FLn−1[7].

As described above, the fourth EXOR operation device 112A performs its EXOR operations on each of four consecutive bits using the same flag FLn−1[0-7].

The AND gate device 113A performs the AND operations on each of the EXOR operators EOR40 through EOR431 in the fourth EXOR operation device 112A and on the control signal /PCdly. The results of the operations are output from the AND gate device 113A to the third EXOR operation device 111A.

A typical structure of the AND gate device 113A is explained below in reference to FIG. 8. The AND gate device 113A includes 32 AND gates AD00 through AD031.

The AND gate AD00 performs the AND operation on the output data from the EXOR operator EOR40 in the fourth EXOR operation device 112A and on the control signal /PCdly.

The AND gate AD01 performs the AND operation on the output data from the EXOR operator EOR41 in the fourth EXOR operation device 112A and on the control signal /PCdly.

The AND gate AD02 performs the AND operation on the output data from the EXOR operator EOR42 in the fourth EXOR operation device 112A and on the control signal /PCdly.

The AND gate AD03 performs the AND operation on the output data from the EXOR operator EOR43 in the fourth EXOR operation device 112A and on the control signal /PCdly.

The AND gate AD04 performs the AND operation on the output data from the EXOR operator EOR44 in the fourth EXOR operation device 112A and on the control signal /PCdly.

The AND gate AD05 performs the AND operation on the output data from the EXOR operator EOR45 in the fourth EXOR operation device 112A and on the control signal /PCdly.

The AND gate AD06 performs the AND operation on the output data from the EXOR operator EOR46 in the fourth EXOR operation device 112A and on the control signal /PCdly.

The AND gate AD07 performs the AND operation on the output data from the EXOR operator EOR47 in the fourth EXOR operation device 112A and on the control signal /PCdly.

In like manner, the AND gate AD028 performs the AND operation on the output data from the EXOR operator EOR428 in the fourth EXOR operation device 112A and on the control signal /PCdly.

The AND gate AD029 performs the AND operation on the output data from the EXOR operator EOR429 in the fourth EXOR operation device 112A and on the control signal /PCdly.

The AND gate AD030 performs the AND operation on the output data from the EXOR operator EOR430 in the fourth EXOR operation device 112A and on the control signal /PCdly.

The AND gate AD031 performs the AND operation on the output data from the EXOR operator EOR431 in the fourth EXOR operation device 112A and on the control signal /PCdly.

The third EXOR operation device 111A performs the EXOR operation on the output data from the AND gate device 113A and on the data latched in the left register 1051 and output from the first pre-charge control device 107. The result of the operation is output from the third EXOR operation device 111A to a fourth flag operation device 114A and to a fifth EXOR operation device 115A.

A typical structure of the third EXOR operation device 111A is explained below in reference to FIG. 8. As shown in FIG. 8, the third EXOR operation device 111A has 32 EXOR operators EOR30 through EOR331 arranged in parallel with the output of the first pre-charge control device 107.

One of the inputs of the EXOR operator EOR30 is connected to the load wire LDL00 for data, and the other input of the EXOR operator EOR30 is connected to the output of the AND gate AD00 in the AND gate device 113A. The EXOR operator EOR30 performs the EXOR operation on the bit data b0 in the left register 1051 and on the data PD0 having undergone the EXOR operation with the flag of the bit data b0.

One of the inputs of the EXOR operator EOR31 is connected to the load wire LDL01 for data, and the other input of the EXOR operator EOR31 is connected to the output of the AND gate AD01 in the AND gate device 113A. The EXOR operator EOR31 performs the EXOR operation on the bit data b1 in the left register 1051 and on the data PD1 having undergone the EXOR operation with the flag of the bit data b1.

One of the inputs of the EXOR operator EOR32 is connected to the load wire LDL02 for data, and the other input of the EXOR operator EOR32 is connected to the output of the AND gate AD02 in the AND gate device 113A. The EXOR operator EOR32 performs the EXOR operation on the bit data b2 in the left register 1051 and on the data PD2 having undergone the EXOR operation with the flag of the bit data b2.

One of the inputs of the EXOR operator EOR33 is connected to the load wire LDL03 for data, and the other input of the EXOR operator EOR33 is connected to the output of the AND gate AD03 in the AND gate device 113A. The EXOR operator EOR33 performs the EXOR operation on the bit data b3 in the left register 1051 and on the data PD3 having undergone the EXOR operation with the flag of the bit data b3.

One of the inputs of the EXOR operator EOR34 is connected to the load wire LDL04 for data, and the other input of the EXOR operator EOR34 is connected to the output of the AND gate AD04 in the AND gate device 113A. The EXOR operator EOR34 performs the EXOR operation on the bit data b4 in the left register 1051 and on the data PD4 having undergone the EXOR operation with the flag of the bit data b4.

One of the inputs of the EXOR operator EOR35 is connected to the load wire LDL05 for data, and the other input of the EXOR operator EOR35 is connected to the output of the AND gate AD05 in the AND gate device 113A. The EXOR operator EOR35 performs the EXOR operation on the bit data b5 in the left register 1051 and on the data PD5 having undergone the EXOR operation with the flag of the bit data b5.

One of the inputs of the EXOR operator EOR36 is connected to the load wire LDL06 for data, and the other input of the EXOR operator EOR36 is connected to the output of the AND gate AD06 in the AND gate device 113A. The EXOR operator EOR36 performs the EXOR operation on the bit data b6 in the left register 1051 and on the data PD6 having undergone the EXOR operation with the flag of the bit data b6.

One of the inputs of the EXOR operator EOR37 is connected to the load wire LDL07 for data, and the other input of the EXOR operator EOR37 is connected to the output of the AND gate AD07 in the AND gate device 113A. The EXOR operator EOR37 performs the EXOR operation on the bit data b7 in the left register 1051 and on the data PD7 having undergone the EXOR operation with the flag of the bit data b7.

In like manner, one of the inputs of the EXOR operator EOR328 is connected to the load wire LDL028 for data, and the other input of the EXOR operator EOR328 is connected to the output of the AND gate AD28 in the AND gate device 113A. The EXOR operator EOR328 performs the EXOR operation on the bit data b28 in the left register 1051 and on the data PD28 having undergone the EXOR operation with the flag of the bit data b28.

One of the inputs of the EXOR operator EOR329 is connected to the load wire LDL029 for data, and the other input of the EXOR operator EOR329 is connected to the output of the AND gate AD29 in the AND gate device 113A. The EXOR operator EOR329 performs the EXOR operation on the bit data b29 in the left register 1051 and on the data PD29 having undergone the EXOR operation with the flag of the bit data b29.

One of the inputs of the EXOR operator EOR330 is connected to the load wire LDL030 for data, and the other input of the EXOR operator EOR330 is connected to the output of the AND gate AD30 in the AND gate device 113A. The EXOR operator EOR330 performs the EXOR operation on the bit data b30 in the left register 1051 and on the data PD30 having undergone the EXOR operation with the flag of the bit data b30.

One of the inputs of the EXOR operator EOR331 is connected to the load wire LDL031 for data, and the other input of the EXOR operator EOR331 is connected to the output of the AND gate AD31 in the AND gate device 113A. The EXOR operator EOR331 performs the EXOR operation on the bit data b31 in the left register 1051 and on the data PD31 having undergone the EXOR operation with the flag of the bit data b31.

The second flag operation device 114A newly generates flags FRn[0] through FRn[7] from the intermediate value data which are supplied from the third EXOR operation device 111A and of which the flags have been reset. The newly generated flags are output from the second flag operation device 114A to the fifth EXOR operation device 115A. In FIG. 7, the flags fed to the fifth EXOR operation device 115A are indicated by reference character FLGn. The flags FRn[0] through FRn[7] generated by the second flag operation device 114A become update values of the flag register 1062 in the second register device 106. The second flag operation device 114A includes eight flag operation circuits 114A-0 through 114A-7.

Figures 9, 10A, 10B:
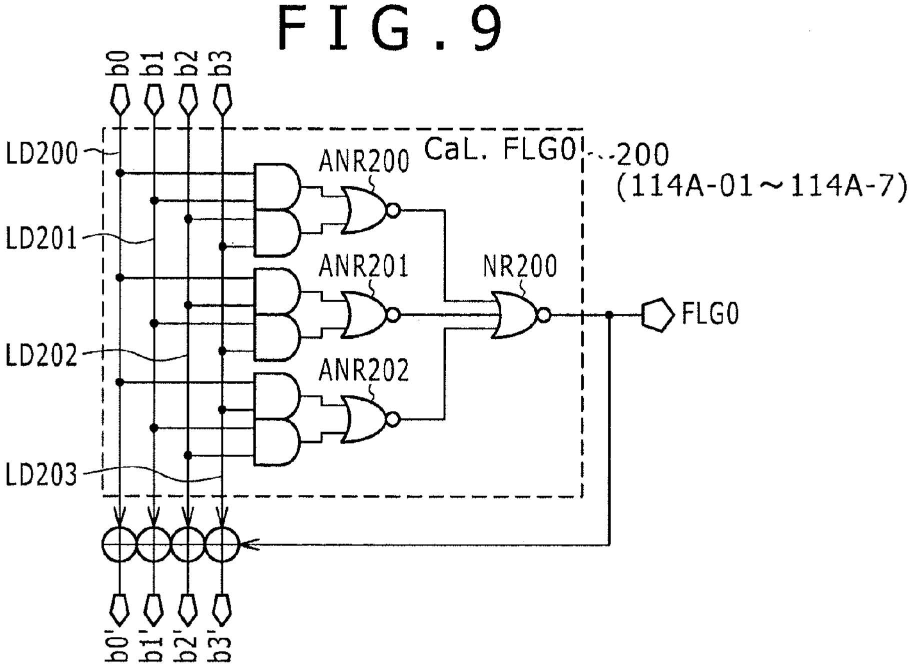
FIG. 9 is a typical structure of a flag operation circuit in a second flag operation device as part of the second embodiment.
FIGS. 10A and 10B are schematic views showing relations between four-bit data and controlled data with regard to the DES operation circuit as the second embodiment.

FIG. 9 is a typical structure of a flag operation circuit in the second flag operation device 114A as part of the second embodiment. In the second flag operation device 114A, each flag operation circuit is designated by reference number 200. The flag operation circuit 200 includes data lines LD200 through LD203, AND-NOR gates ANR200 through ANR202, and a three-input NOR gate NR200.

A first input terminal and a second input terminal of the AND-NOR gate ANR200 are connected to the data lines LD200 and LD201, respectively. A third input terminal and a fourth input terminal of the AND-NOR gate ANR200 are connected to the data lines LD202 and LD203, respectively.

A first input terminal and a second input terminal of the AND-NOR gate ANR201 are connected to the data lines LD200 and LD202, respectively. A third input terminal and a fourth input terminal of the AND-NOR gate ANR201 are connected to the data lines LD201 and LD203, respectively.

A first input terminal and a second input terminal of the AND-NOR gate ANR202 are connected to the data lines LD200 and LD203, respectively. A third input terminal and a fourth input terminal of the AND-NOR gate ANR202 are connected to the data lines LD201 and LD202, respectively.

A first input terminal of the NOR gate NR200 is connected the output of the AND-NOR gate ANR200. A second input terminal of the NOR gate NR200 is connected to the output of the AND-NOR gate ANR201. A third input terminal of the NOR gate NR200 is connected to the output of the AND-NOR gate ANR202.

The flag operation circuit 200 of FIG. 9 has the three AND-NOR gates ANR200 through ANR202 and the three-input NOR gate NR200 arranged as described above to deal with bit data. If a data group of four bits input to the flag operation circuit 200 includes at least three 1's, then the three-input NOR gate NR200 outputs a High flag that causes the data to be inverted.

FIGS. 10A and 10B give typical results of operations performed by the flag operation circuit 200, schematically showing relations between four-bit data and controlled data with regard to the DES operation circuit as the second embodiment. FIG. 10A indicates typical input data before control and their original Hamming weights, and FIG. 10B depicts the controlled flag values, the data controlled thereby, and the actual Hamming weights including the flag values of the controlled data.

If four-bit data (b0, b1, b2, b3) are (0, 0, 0, 0) before control, the Hamming weight (HW) is "0." After control, the flag FLGn is "0," the four-bit controlled data (b0', b1', b2', b3') are (0, 0, 0, 0) and the Hamming weight after control (HW') is "0."

If four-bit data (b0, b1, b2, b3) are (0, 0, 0, 1) before control, the HW is "1." After control, the flag FLGn is "0," the four-bit controlled data (b0', b1', b2', b3') are (0, 0, 0, 1), and the HW' is "1."

If four-bit data (b0, b1, b2, b3) are (0, 0, 1, 0) before control, the HW is "1." After control, the flag FLGn is "0," the four-bit controlled data (b0', b1', b2', b3') are (0, 0, 1, 0), and the HW' is "1."

If four-bit data (b0, b1, b2, b3) are (0, 0, 1, 1) before control, the HW is "2." After control, the flag FLGn is "0," the four-bit controlled data (b0', b1', b2', b3') are (0, 0, 1, 1), and the HW' is "2."

If four-bit data (b0, b1, b2, b3) are (0, 1, 0, 0) before control, the HW is "1." After control, the flag FLGn is "0," the four-bit controlled data (b0', b1', b2', b3') are (0, 1, 0, 0), and the HW' is "1."

If four-bit data (b0, b1, b2, b3) are (0, 1, 0, 1) before control, the HW is "2." After control, the flag FLGn is "0," the four-bit controlled data (b0', b1', b2', b3') are (0, 1, 0, 1), and the HW' is "2."

If four-bit data (b0, b1, b2, b3) are (0, 1, 1, 0) before control, the HW is "2." After control, the flag FLGn is "0," the four-bit controlled data (b0', b1', b2', b3') are (0, 1, 1, 0), and the HW' is "2."

If four-bit data (b0, b1, b2, b3) are (0, 1, 1, 1) before control, the HW is "3." After control, the flag FLGn is "1," the four-bit controlled data (b0', b1', b2', b3') are (1, 0, 0, 0), and the HW' is "2."

If four-bit data (b0, b1, b2, b3) are (1, 0, 0, 0) before control, the HW is "1." After control, the flag FLGn is "0," the four-bit controlled data (b0', b1', b2', b3') are (1, 0, 0, 0), and the HW' is "1."

If four-bit data (b0, b1, b2, b3) are (1, 0, 0, 1) before control, the HW is "2." After control, the flag FLGn is "0," the four-bit controlled data (b0', b1', b2', b3') are (1, 0, 0, 1), and the HW' is "2."

If four-bit data (b0, b1, b2, b3) are (1, 0, 1, 0) before control, the HW is "2." After control, the flag FLGn is "0," the four-bit controlled data (b0', b1', b2', b3') are (1, 0, 1, 0), and the HW' is "2."

If four-bit data (b0, b1, b2, b3) are (1, 0, 1, 1) before control, the HW is "3." After control, the flag FLGn is "1," the four-bit controlled data (b0', b1', b2', b3') are (0, 1, 0, 0), and the HW' is "2."

If four-bit data (b0, b1, b2, b3) are (1, 1, 0, 0) before control, the HW is "2." After control, the flag FLGn is "0," the four-bit controlled data (b0', b1', b2', b3') are (1, 1, 0, 0), and the HW' is "2."

If four-bit data (b0, b1, b2, b3) are (1, 1, 0, 1) before control, the HW is "3." After control, the flag FLGn is "1," the four-bit controlled data (b0', b1', b2', b3') are (0, 0, 1, 0), and the HW' is "2."

If four-bit data (b0, b1, b2, b3) are (1, 1, 1, 0) before control, the HW is "3." After control, the flag FLGn is "1," the four-bit controlled data (b0', b1', b2', b3') are (0, 0, 0, 1), and the HW' is "2."

If four-bit data (b0, b1, b2, b3) are (1, 1, 1, 1) before control, the HW is "4." After control, the flag FLGn is "1," the four-bit controlled data (b0', b1', b2', b3') are (0, 0, 0, 0), and the HW' is "1."

As shown in FIGS. 10A and 10B, the HW is kept at two bits or less in all cases. Although the DES operation circuit involves 32 signals, the HW is held at 16 bits or less so that maximum power consumption is reduced.

The fifth EXOR operation device 115A performs the EXOR operations on the results of the operations performed by the EXOR operators EOR30 through EOR331 in the third EXOR operation device 111A and on the flags FRn[0] through FRn[7] generated by the second flag operation device 114A. The operation result data b0' through b31' from the fifth EXOR operation device 115A become update data of the right register 1061 in the second register device 106.

A typical structure of the fifth EXOR operation device 115A is explained below in reference to FIG. 8. As shown in FIG. 8, the fifth EXOR operation device 115A has 32 EXOR operators EOR50 through EOR531 arranged in parallel with the output of an EOR operation device 111A.

One input of the EXOR operator EOR50 is connected to the output of the EXOR operator EOR30 in the third EXOR operation device 111A, and the other input of the EXOR operator EOR50 is connected to the output line for the flag FRn[0] of the second flag operation device 114A. The EXOR operator EOR50 performs the EXOR operation on the output data from the EXOR operator EOR30 and on the flag FRn[0].

One input of the EXOR operator EOR51 is connected to the output of the EXOR operator EOR31 in the third EXOR operation device 111A, and the other input of the EXOR operator EOR51 is connected to the output line for the flag FRn[0] of the second flag operation device 114A. The EXOR operator EOR51 performs the EXOR operation on the output data from the EXOR operator EOR31 and on the flag FRn[0].

One input of the EXOR operator EOR52 is connected to the output of the EXOR operator EOR32 in the third EXOR operation device 111A, and the other input of the EXOR operator EOR52 is connected to the output line for the flag FRn[0] of the second flag operation device 114A. The EXOR operator EOR52 performs the EXOR operation on the output data from the EXOR operator EOR32 and on the flag FRn[0].

One input of the EXOR operator EOR53 is connected to the output of the EXOR operator EOR33 in the third EXOR operation device 111A, and the other input of the EXOR operator EOR53 is connected to the output line for the flag FRn[0] of the second flag operation device 114A. The EXOR operator EOR53 performs the EXOR operation on the output data from the EXOR operator EOR33 and on the flag FRn[0].

One input of the EXOR operator EOR54 is connected to the output of the EXOR operator EOR34 in the third EXOR operation device 111A, and the other input of the EXOR operator EOR54 is connected to the output line for the flag FRn[1] of the second flag operation device 114A. The EXOR operator EOR54 performs the EXOR operation on the output data from the EXOR operator EOR34 and on the flag FRn[1].

One input of the EXOR operator EOR55 is connected to the output of the EXOR operator EOR35 in the third EXOR operation device 111A, and the other input of the EXOR operator EOR55 is connected to the output line for the flag FRn[1] of the second flag operation device 114A. The EXOR operator EOR55 performs the EXOR operation on the output data from the EXOR operator EOR35 and on the flag FRn[1].

One input of the EXOR operator EOR56 is connected to the output of the EXOR operator EOR36 in the third EXOR operation device 111A, and the other input of the EXOR operator EOR56 is connected to the output line for the flag FRn[1] of the second flag operation device 114A. The EXOR operator EOR56 performs the EXOR operation on the output data from the EXOR operator EOR36 and on the flag FRn[1].

One input of the EXOR operator EOR57 is connected to the output of the EXOR operator EOR37 in the third EXOR operation device 111A, and the other input of the EXOR operator EOR57 is connected to the output line for the flag FRn[1] of the second flag operation device 114A. The EXOR operator EOR57 performs the EXOR operation on the output data from the EXOR operator EOR37 and on the flag FRn[1].

In like manner, one input of the EXOR operator EOR528 is connected to the output of the EXOR operator EOR328 in the third EXOR operation device 111A, and the other input of the EXOR operator EOR528 is connected to the output line for the flag FRn[7] of the second flag operation device 114A. The EXOR operator EOR528 performs the EXOR operation on the output data from the EXOR operator EOR328 and on the flag FRn[7].

One input of the EXOR operator EOR529 is connected to the output of the EXOR operator EOR329 in the third EXOR operation device 111A, and the other input of the EXOR operator EOR529 is connected to the output line for the flag FRn[7] of the second flag operation device 114A. The EXOR operator EOR529 performs the EXOR operation on the output data from the EXOR operator EOR329 and on the flag FRn[7].

One input of the EXOR operator EOR530 is connected to the output of the EXOR operator EOR330 in the third EXOR operation device 111A, and the other input of the EXOR operator EOR530 is connected to the output line for the flag FRn[7] of the second flag operation device 114A. The EXOR operator EOR530 performs the EXOR operation on the output data from the EXOR operator EOR330 and on the flag FRn[7].

One input of the EXOR operator EOR531 is connected to the output of the EXOR operator EOR331 in the third EXOR operation device 111A, and the other input of the EXOR operator EOR531 is connected to the output line for the flag FRn[7] of the second flag operation device 114A. The EXOR operator EOR531 performs the EXOR operation on the output data from the EXOR operator EOR331 and on the flag FRn[7].

As described above, the fifth EXOR operation device 115A performs its EXOR operations on each of four consecutive bits using the same flag FRn[0-7].

Figure 11:
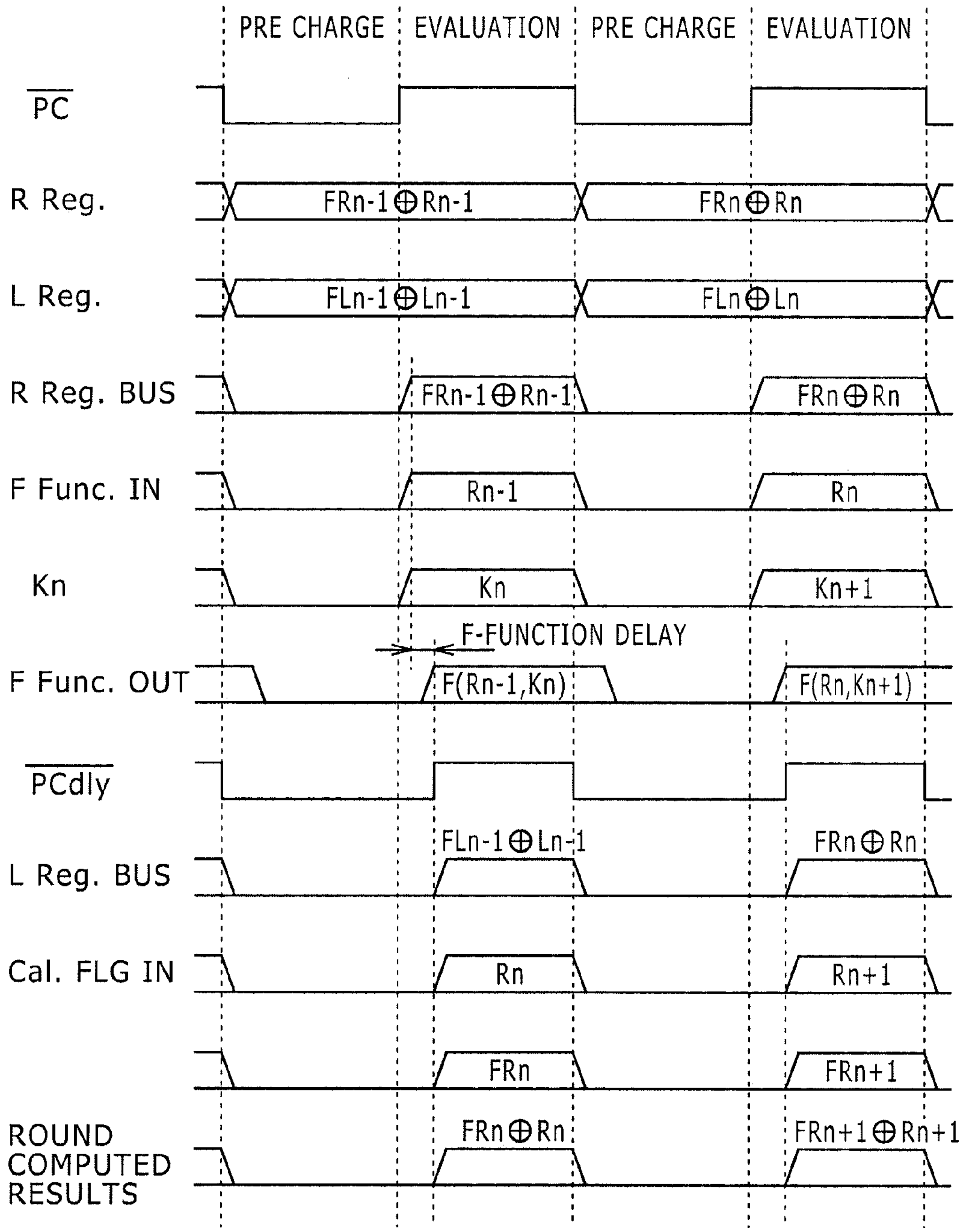
FIG. 11 is a timing chart explanatory of how the DES operation circuit as the second embodiment typically operates.
Figure 12:
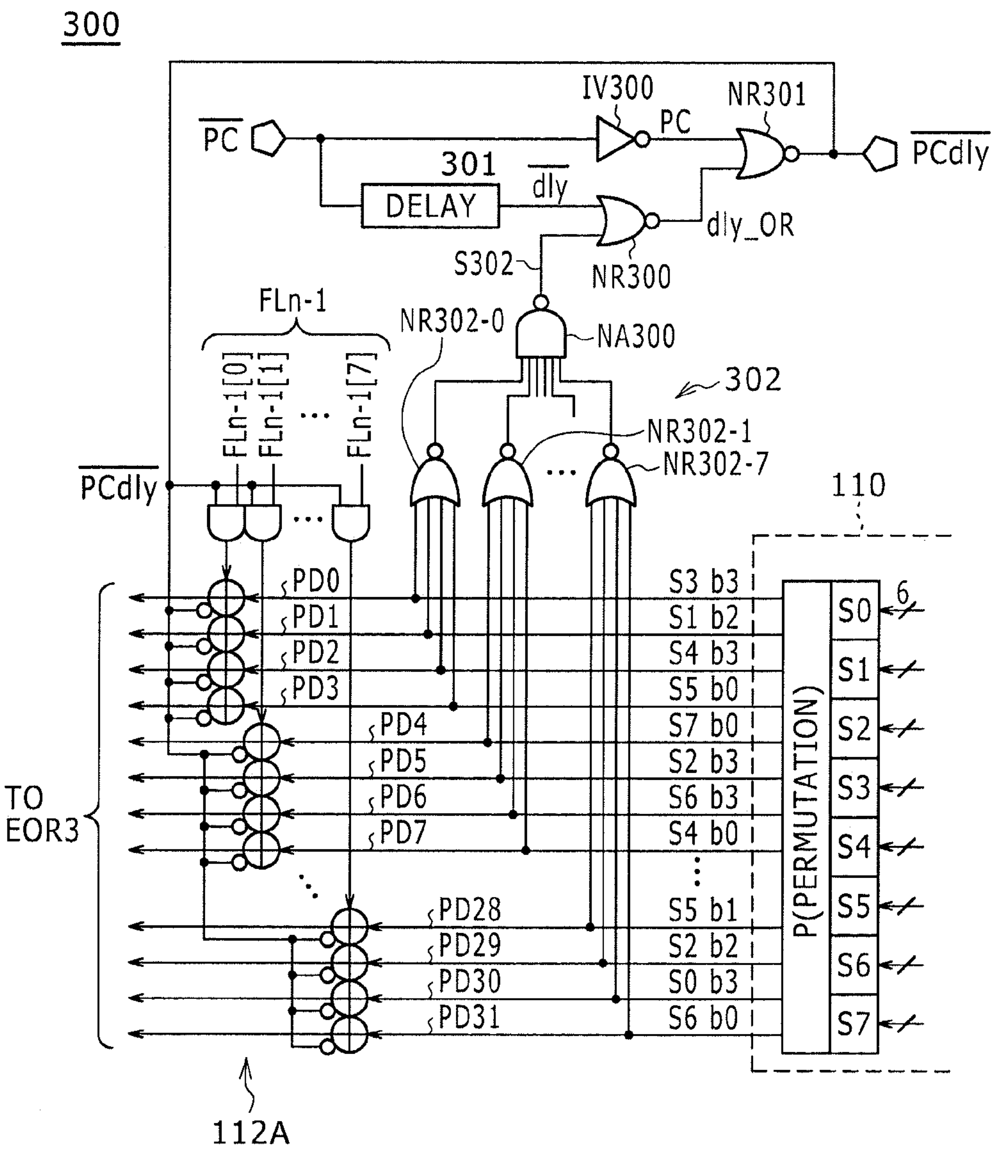
FIG. 12 is a circuit diagram showing a typical structure of a control signal generation circuit as part of the second embodiment.

Explained below in detail with reference to FIGS. 11 through 14C are the workings of the DES operation circuit 100A as the second embodiment, and a typical structure of a suitable control signal generation circuit as part of the second embodiment. FIG. 11 is a timing chart explanatory of how the DES operation circuit as the second embodiment typically operates. FIG. 12 is a circuit diagram showing the representative structure of the control signal generation circuit as part of the second embodiment. FIG. 13 is a timing chart of the circuit in FIG. 12. FIGS. 14A, 14B and 14C show an EXOR-AND circuit, circuit symbols, and a truth table respectively.

In operation, the DES operation circuit 100A is controlled in two phases composed of a pre-charge phase and an evaluation phase per round. While the control signals /PC and /PCdly are being Low, the signals on all output wires of the registers are controlled to "0."

When the control signal /PC or /PCdly is brought High, the registers have their latched data output onto the output wires. In this case, the number of "1" bits under flag control is kept at two or less in groups of four bits. As a result, the number of bits set to "1" is less than half the bus width. While the control signal /PC is being Low, the outputs on the side of the second register 106 are all held Low.

At a rising edge of the control signal /PC, the data "FRn−1±Rn−1" latched in the right register 1061 and the flag "FRn−1" latched in the flag register 1062 are input to the F-function device 110 and to the first register device 105.

The original value "Rn−1" is input to the F-function device 110 following the EXOR operation performed by the second EXOR operation device 109, and an F-function operation is started. Upon elapse of a predetermined time period, the result of the F-function operation "F(Rn−1,Kn)" is output.

At about the same time, the control signal /PCdly rises (as will be discussed later in more detail), causing the flag register value "FLn−1" latched in the first register device 105 to be output and exclusive-OR'ed with the output from the F-function device 110 by the fourth EXOR operation device 112A. The result of the EXOR operation is input to the AND gate 113A.

The other signal input to each of the AND gates in the AND gate device 113A is the control signal /PCdly controlled to rise at about the same time that the F-function output is established. Thus when the control signal /PCdly rises, the output "FLn−1±F(Rn−1,Kn)" from the fourth EXOR operation device 112A is supplied to the third EXOR operation device 111A.

Meanwhile, the output from the first register device 105 is held Low while the control signal /PCdly is being Low. The moment the control signal /PCdly is brought High, the output is replaced by the value "FLn−1±Ln−1" latched in the left register 1051. The value "FLn−1±Ln−1" is then exclusive-OR'ed by the third EXOR operation device 111A with the value "FLn−1±F(Rn−1,Kn)" output at about the same time from the AND gate device 113A.

The EXOR operation resets the flag value "FLn−1." The result of the operation "F(Rn−1,Kn)±Ln−1=Rn" is input to the second flag operation device 114A.

The flag operation device 114A operates on the flag value "FRn" of each data group of four bits. The fifth EXOR operation device 115A inverts each of the four bits making up each data group in the result of the round operation "Rn," thereby generating data "FRn±Rn" to be latched on the right register side in the next round.

As shown in FIG. 9, the flag operation circuit in the second flag operation device 114A has three AND-NOR gates and a three-input NOR gate arranged to deal with four-bit data. In this circuit, the three-input NOR gate goes High if the number of "1" bits in the four-bit data is at least three, and the resulting flag value causes the data to be inverted.

As shown in FIGS. 10A and 10B, the result of the operation performed by this flag operation circuit is such that the HW is kept at two bits or less in any data group. Whereas the DES operation circuit has 32 signal lines, the HW is kept at 16 bits or less so that maximum power consumption is reduced.

When there is a difference in timing between two data inputs to be established, the output of the EOR operation circuit temporarily effects transition to the initially established data before being replaced by the original output, which entails consumption of extra charging and discharging currents. It follows that if the two inputs effect transition at about the same time, then the occurrence of the charging and discharging currents for extra signals can be suppressed.

With the second embodiment, the control signal /PCdly for controlling the timing of data input to the EXOR operation device is generated by the circuit shown in FIG. 12. This structure makes it possible to inhibit transition to the temporary data.

As mentioned above, FIG. 12 is a circuit diagram showing a typical structure of the control signal generation circuit 300 as part of the second embodiment. FIG. 13 is a timing chart of the circuit 300 in FIG. 12. The control signal generation circuit 300 includes a delay circuit 301, two-input NOR gates NR300 and NR301, an inverter IV300, and a monitor circuit 302 for monitoring the output of the F-function device 110.

The monitor circuit 302 is constituted by four-input NOR gates NR302-0 through NR302-7 to which four consecutive bits of the output data PD0 through PD31 from the F-function device 110 are input, and by a NAND gate NA300 to which the outputs from the NOR gates NR302-0 through NR302-7 are input.

The control signal generation circuit 300 generates the control signal /PCdly by NOR'ing an inverted signal PC derived from the control signal /PC with a NOR signal. This NOR signal is obtained by NOR'ing the signal acquired by the delay circuit 301 delaying the control signal /PC, with an F-function output monitor signal 5302. The delay time used by the delay circuit 301 in the control signal generation circuit 300 is set to be longer than the delay time for the F-function operation.

In the pre-charge phase, as shown in FIG. 13, the control signal /PC controls to "0" all inputs of the F-function device 110. The outputs from the F-function device 110 are also all "0."

When the control signal /PC rises and causes data to be input to the F-function device 110, the F-function device 110 performs its operations. When at least one bit of the outputs from the F-function device 110 is brought to "1," then the output of the monitor circuit 302 goes High, and the control signal /PCdly is brought High.

All outputs from the F-function device 110 might be "0." If that is the case, the output from the monitor circuit 302 monitoring the output of the F-function device 110 remains unchanged. In this case, the control signal /PCdly is brought High at a rising edge of the delay signal derived from the control signal /PC.

The control signal /PCdly generated here controls the outputs from the F-function device 110 as well as the transition timings of the data undergoing the EXOR operations. For this reason, at about the same time that the outputs from the F-function device 110 are established, the input value to the fourth EXOR operation device 112A effects transition. This suppresses the transition of the data output from the EXOR operation device 112A to temporary data.

In the circuit of FIG. 8, a delay occurs during the charging of the paths between the fourth EXOR operation device 112A and the AND gate device 113A. An extra current is then generated due to the difference in delay relative to the value latched in the left register of the third EXOR operation device 111A.

In order to suppress the extra current, the circuit of FIG. 8 may be replaced by an EXOR-AND circuit 400 shown in FIG. 14A. This arrangement eliminates the delay between the second EXOR operation device 112A and the AND gate device 113A, thereby inhibiting the charging current caused by the difference in delay in the third EXOR operation device 111A.

The other structures of the second embodiment are basically the same as those of the first embodiment, so that the second embodiment provides substantially the same effects in these respects as the first embodiment.

With the second embodiment, as described above, flag operations are carried out in data groups of a predetermined number of bits, and the resulting flag values are used to control data inversion. These arrangements constitute a scheme whereby the number of changing bits is controlled to less than half the width of the bus carrying the register outputs. It is then possible to reduce the operating current stemming from charging and discharging of the signal bus.

<3. Third Embodiment>

The third embodiment of the present invention will now be explained. What follows is a detailed description of how the third embodiment is structured to enhance resistance to DPA by keeping substantially constant the HW of the intermediate values of operation results thereby stabilizing the charging and discharging currents on the signal bus.

FIG. 15 is a schematic view showing the controlled results of FIG. 10 seen from a data disturbance point of view in conjunction with the third embodiment of the present invention. FIG. 15 thus indicates relations between original data and the data after flag control.

Illustratively, of the eight 0's making up bit data "b0," only one bit is inverted to 1 and the rest remains 0's. Of the eight 1's, four bits are inverted to 0's and the other four remain 1's. That is, the "0" data are not sufficiently disturbed but the "1" data are disturbed in a sufficiently effective manner.

DPA attacks involve estimating a six-bit key of sub-S-boxes to simulate a large number of plain texts, classifying the resulting current waveforms into groups by determining whether the node of interest is "0" or "1" to find the differences between the average waveforms of the groups, and then determining the validity of the estimated six-bit key by checking the presence or absence of peaks.

Where the third embodiment is in place, even if the key is correctly estimated, a one-eighth of the bits constituting the data group estimated to be made of 0's is inverted to 1. Half of the bits constituting the data group estimated to be composed of 1's are inverted to 0's. Thus the third embodiment provides higher resistance to DPA than ordinary setups with no countermeasure.

The bits to be inverted under control are further subjected to permutation by the F-function device 110. The bits thus permutated are divided successively into groups of four bits of which the flag is calculated for inversion control. The results are shown in FIG. 16.

Figure 16:
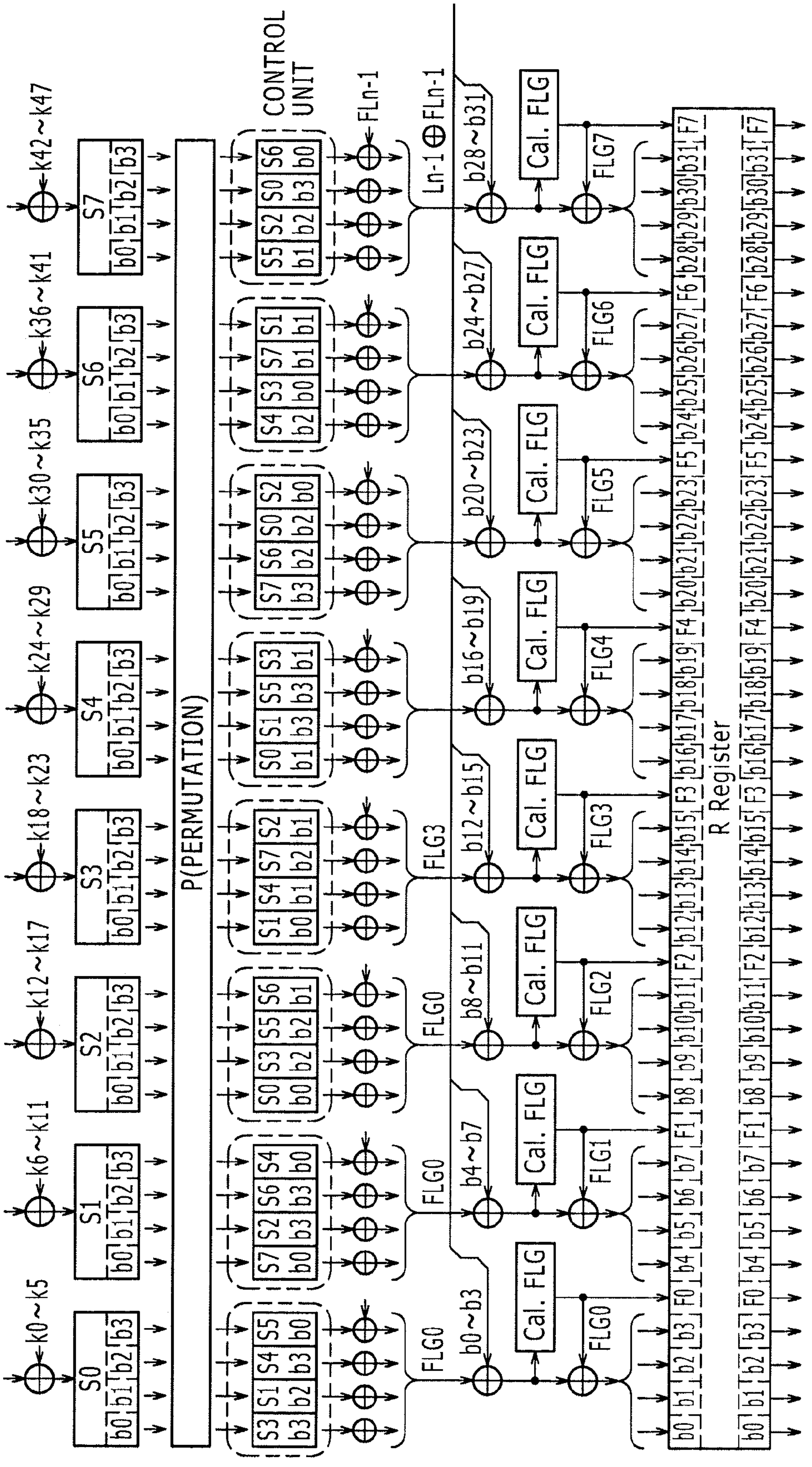
FIG. 16 is a schematic view which, when flags are calculated successively in groups of four bits for inversion control, shows how the four bits of a sub-S-box “S0” are permutated by a permutation device, how flags are calculated in each different group, and how inversion control is effected accordingly.

As shown in FIG. 16, where data are divided into groups of four bits of which the flag is calculated for inversion control, the four bits of, say, the sub-S-box "S0" are permutated, and each of the bits is subjected to flag operations with different groups and submitted to inversion control accordingly. That is, each of the four bits in the "S0" output is independently subjected to inversion control based on the results of different flag operations. This arrangement provides improved resistance to DPA compared with ordinary setups having no countermeasure.

Figure 17:
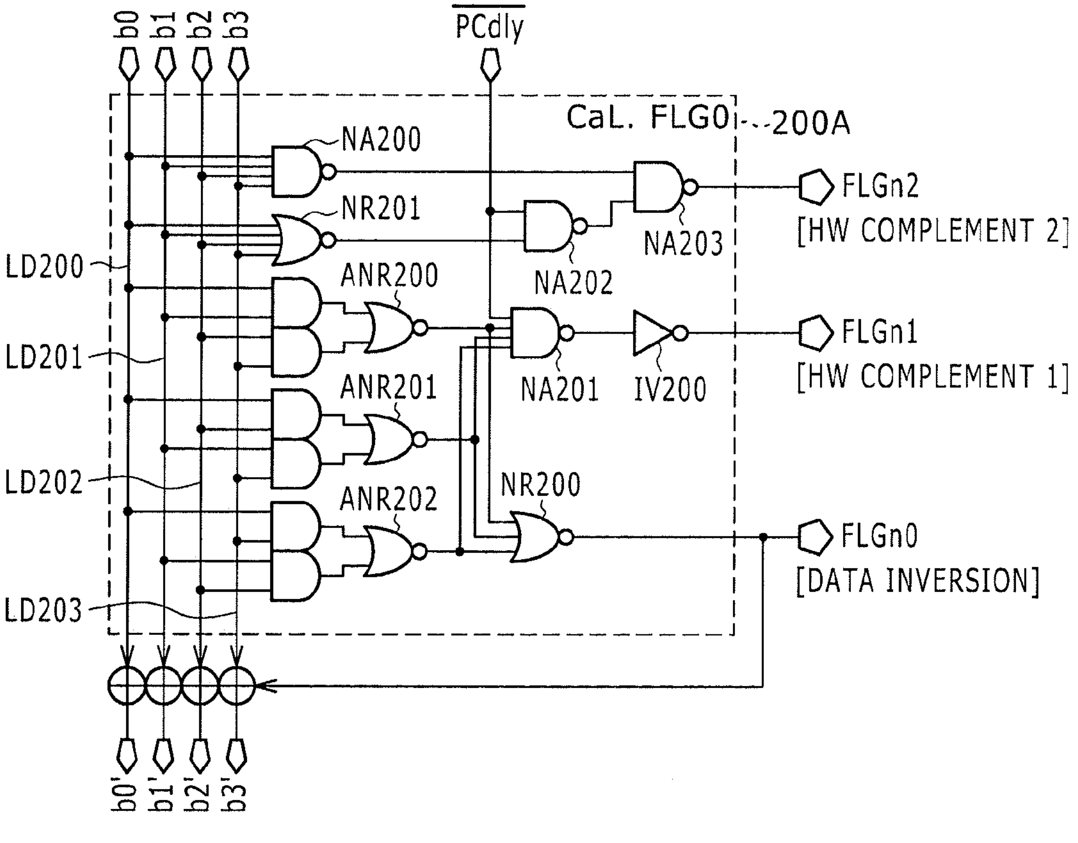
FIG. 17 is a schematic view showing a typical structure of a flag operation circuit in a second flag operation device as part of the third embodiment.

It is also possible to use another structure shown in FIG. 17 whereby the flag for each group of bits is supplemented with two more bits to provide a three-bit output. This structure is implemented by adding a flag operation circuit of two additional bits to the flag operation circuit shown in FIG. 9.

FIG. 17 is a schematic view showing a typical structure of a flag operation circuit 200A in a second flag operation device as part of the third embodiment. In addition to the structure of the flag operation circuit 200 in FIG. 9, the flag operation circuit 200A in FIG. 17 includes a four-input NOR gate NR201, four-input NAND gates NA200 and NA201, two-input NAND gates NA202 and NA203, and an inverter IV200.

The four inputs of the NOR gate NR201 are connected to the data lines LD200 through LD203, respectively. Likewise, the four inputs of the NAND gate NA200 are connected to the data lines LD200 through LD203, respectively.

A first input terminal of the NAND gate NA201 is connected to the supply line for the control signal /PCdly. A second input terminal, a third input terminal and a fourth input terminal of the NAND gate NA201 are connected to the AND-NOR gates ANR200, ANR201 and ANR202, respectively.

The output of the NAND gate NA201 is connected to the input terminal of the inverter IV200. The output terminal of the inverter IV200 outputs a flag signal FLGn1.

A first input terminal of the NAND gate NA202 is connected to the supply line for the control signal /PCdly. A second input terminal of the NAND gate NA202 is connected to the output terminal of the NOR gate NR201.

A first input terminal of the NAND gate NA203 is connected to the output terminal of the NAND gate NA200, and a second input terminal of the NAND gate NA203 is connected to the output terminal of the NAND gate NA202. The output terminal of the NAND gate NA203 outputs a flag signal FLGn2.

FIGS. 18A and 18B are schematic views showing results from the operations performed by the flag operation circuit 200A in FIG. 17. These views present relations between four-bit data and controlled data with regard to the DES operation circuit as the third embodiment. FIG. 18A indicates typical input data before control and their original Hamming weights, and FIG. 18B depicts the controlled flag values, the data controlled thereby, and the actual Hamming weights including the flag values of the controlled data.

If four-bit data (b0, b1, b2, b3) are (0, 0, 0, 0) before control, the Hamming weight (HW) is "0." After control, flags FLGn0, FLGn1 and FLGn2 are (0, 1, 1), the four-bit controlled data (b0', b1', b2', b3') are (0, 0, 0, 0) and the Hamming weight after control (HW') is "2."

If four-bit data (b0, b1, b2, b3) are (0, 0, 0, 1) before control, the HW is "1." After control, the flags FLGn0, FLGn1 and FLGn2 are (0, 1, 0), the four-bit controlled data (b0', b1', b2', b3') are (0, 0, 0, 1) and the HW' is "2."

If four-bit data (b0, b1, b2, b3) are (0, 0, 1, 0) before control, the HW is "1." After control, the flags FLGn0, FLGn1 and FLGn2 are (0, 1, 0), the four-bit controlled data (b0', b1', b2', b3') are (0, 0, 1, 0) and the HW' is "2."

If four-bit data (b0, b1, b2, b3) are (0, 0, 1, 1) before control, the HW is "2." After control, the flags FLGn0, FLGn1 and FLGn2 are (0, 0, 0), the four-bit controlled data (b0', b1', b2', b3') are (0, 0, 1, 1) and the HW' is "2."

If four-bit data (b0, b1, b2, b3) are (0, 1, 0, 0) before control, the HW is "1." After control, the flags FLGn0, FLGn1 and FLGn2 are (0, 1, 0), the four-bit controlled data (b0', b1', b2', b3') are (0, 1, 0, 0) and the HW' is "2."

If four-bit data (b0, b1, b2, b3) are (0, 1, 0, 1) before control, the HW is "2." After control, the flags FLGn0, FLGn1 and FLGn2 are (0, 0, 0), the four-bit controlled data (b0', b1', b2', b3') are (0, 1, 0, 1) and the HW' is "2."

If four-bit data (b0, b1, b2, b3) are (0, 1, 1, 0) before control, the HW is "2." After control, the flags FLGn0, FLGn1 and FLGn2 are (0, 0, 0), the four-bit controlled data (b0', b1', b2', b3') are (0, 1, 1, 0) and the HW' is "2."

If four-bit data (b0, b1, b2, b3) are (0, 1, 1, 1) before control, the HW is "3." After control, the flags FLGn0, FLGn1 and FLGn2 are (1, 0, 0), the four-bit controlled data (b0', b1', b2', b3') are (1, 0, 0, 0) and the HW' is "2."

If four-bit data (b0, b1, b2, b3) are (1, 0, 0, 0) before control, the HW is "1." After control, the flags FLGn0, FLGn1 and FLGn2 are (0, 1, 0), the four-bit controlled data (b0', b1', b2', b3') are (1, 0, 0, 0) and the HW' is "2."

If four-bit data (b0, b1, b2, b3) are (1, 0, 0, 1) before control, the HW is "2." After control, the flags FLGn0, FLGn1 and FLGn2 are (0, 0, 0), the four-bit controlled data (b0', b1', b2', b3') are (1, 0, 0, 1) and the HW' is "2."

If four-bit data (b0, b1, b2, b3) are (1, 0, 1, 0) before control, the HW is "2." After control, the flags FLGn0, FLGn1 and FLGn2 are (0, 0, 0), the four-bit controlled data (b0', b1', b2', b3') are (1, 0, 1, 0) and the HW' is "2."

If four-bit data (b0, b1, b2, b3) are (1, 0, 1, 1) before control, the HW is "3." After control, the flags FLGn0, FLGn1 and FLGn2 are (1, 0, 0), the four-bit controlled data (b0', b1', b2', b3') are (0, 1, 0, 0) and the HW' is "2."

If four-bit data (b0, b1, b2, b3) are (1, 1, 0, 0) before control, the HW is "2." After control, the flags FLGn0, FLGn1 and FLGn2 are (0, 0, 0), the four-bit controlled data (b0', b1', b2', b3') are (1, 1, 0, 0) and the HW' is "2."

If four-bit data (b0, b1, b2, b3) are (1, 1, 0, 1) before control, the HW is "3." After control, the flags FLGn0, FLGn1 and FLGn2 are (1, 0, 0), the four-bit controlled data (b0', b1', b2', b3') are (0, 0, 1, 0) and the HW' is "2."

If four-bit data (b0, b1, b2, b3) are (1, 1, 1, 0) before control, the HW is "3." After control, the flags FLGn0, FLGn1 and FLGn2 are (1, 0, 0), the four-bit controlled data (b0', b1', b2', b3') are (0, 0, 0, 1) and the HW' is "2."

If four-bit data (b0, b1, b2, b3) are (1, 1, 1, 1) before control, the HW is "4." After control, the flags FLGn0, FLGn1 and FLGn2 are (1, 0, 1), the four-bit controlled data (b0', b1', b2', b3') are (0, 0, 0, 0) and the HW' is "2."

If the structure of FIG. 17 is used, the HW including the flags is two bits for any and all data. Utilizing this structure provides the same effects as adopting the complementary structure, which further improves resistance to DPA.

In the flag operation circuit 200A of FIG. 17, the output signal FLGn0 is the same as the output signal from the flag operation circuit 200 in FIG. 9 as part of the second embodiment. This signal goes High when at least three out of the four bits are "1." The output signal FLGn1 goes High when one bit or none of the four bits is "1." The output signal FLGn2 is brought High when the four bits are either all "0" or all "1." In any combination of these control signals and control data, the HW is two for all data.

It should be noted that the control signal FLGn1 and FLGn2 added in FIG. 17 are not used to control data. These control signals serve to constitute dummy registers and their load wires which conceal the correlation between the registers and their load wires carrying charging and discharging currents on the one hand, and the data involved on the other hand. It is necessary to install a register arrangement in which a signal value equivalent to that of the control signal FLGn0 is to be latched and around which suitable load wires are to be laid out. This structure remains the same regardless of data from the point of view of the charging and discharging currents on the signal bus.

The complementary structure exists as a countermeasure against DPA with a view to providing the effects above. In the case of the complementary structure, however, each of the bits involved typically entails a single-bit signal change that causes the charging current of the signal line to flow. The third embodiment, by contrast, consumes half the amount of the currents dissipated by the complementary structure and also has data inverted under control, although at an insufficient level.

<4. Fourth Embodiment>

The fourth embodiment of the present invention is explained below. What follows is a detailed description of how the fourth embodiment is structured to enhance resistance to DPA by disturbing the intermediate values of operation results depending on the values.

The structure to be discussed below involves having flag operations carried out in data groups of four bits and executing inversion control in keeping with the results of the operations. This structure is implemented illustratively by replacing the flag operation circuit 114A in FIG. 8 with a different flag operation circuit shown in FIG. 19.

Figures 19, 20A, 20B:
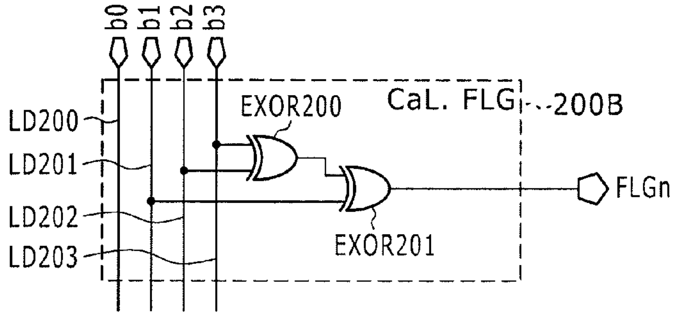
FIG. 19 is a schematic view showing a typical structure of a flag operation circuit in a second flag operation device of a DES operation circuit as a fourth embodiment of the present invention.
FIGS. 20A and 20B are schematic views showing results from the operations performed by the flag operation circuit in FIG. 19, thus presenting relations between four-bit data and controlled data with regard to the DES operation circuit as the fourth embodiment.

FIG. 19 is a schematic view showing a typical structure of the flag operation circuit 200B in the second flag operation device of the DES operation circuit as the fourth embodiment of the present invention. In the flag operation circuit 200B of FIG. 19, EXOR gates EXOR200 and EXOR201 replace the AND-NOR gates ANR200 through ANR202 and the NOR gate NR200 in the flag operation circuit 200 of FIG. 9.

A first input terminal and a second input terminal of the EXOR gate EXOR200 are connected to the data lines LD203 and LD202, respectively. A first input terminal and a second input terminal of the EXOR gate EXOR201 are connected to the output terminal of the EXOR gate EXOR200 and to the data line LD201, respectively.

FIGS. 20A and 20B are schematic views showing results from the operations performed by the flag operation circuit 200B in FIG. 19. These views present relations between four-bit data and controlled data with regard to the DES operation circuit as the fourth embodiment.

FIG. 20A indicates typical input data before control and their original Hamming weights, and FIG. 20B depicts the controlled flag values, the data controlled thereby, and the actual Hamming weights including the flag values of the controlled data. FIG. 21 is a schematic view showing controlled states of "0" and "1" in each of the bits involved in FIGS. 20A and 20B.

FIGS. 20A and 20B indicate the following relations.

If four-bit data (b0, b1, b2, b3) are (0, 0, 0, 0) before control, the Hamming weight (HW) is "0." After control, the flag FLGn is "0," the four-bit controlled data (b0', b1', b2', b3') are (0, 0, 0, 0) and the Hamming weight after control (HW') is "0."

If four-bit data (b0, b1, b2, b3) are (0, 0, 0, 1) before control, the HW is "1." After control, the flag FLGn is "1," the four-bit controlled data (b0', b1', b2', b3') are (1, 1, 1, 0) and the HW' is "4."

If four-bit data (b0, b1, b2, b3) are (0, 0, 1, 0) before control, the HW is "1." After control, the flag FLGn is "1," the four-bit controlled data (b0', b1', b2', b3') are (1, 1, 0, 1) and the HW' is "4."

If four-bit data (b0, b1, b2, b3) are (0, 0, 1, 1) before control, the HW is "2." After control, the flag FLGn is "0," the four-bit controlled data (b0', b1', b2', b3') are (0, 0, 1, 1) and the HW' is "2."

If four-bit data (b0, b1, b2, b3) are (0, 1, 0, 0) before control, the HW is "1." After control, the flag FLGn is "1," the four-bit controlled data (b0', b1', b2', b3') are (1, 0, 1, 1) and the HW' is "4."

If four-bit data (b0, b1, b2, b3) are (0, 1, 0, 1) before control, the HW is "2." After control, the flag FLGn is "0," the four-bit controlled data (b0', b1', b2', b3') are (0, 1, 0, 1) and the HW' is "2."

If four-bit data (b0, b1, b2, b3) are (0, 1, 1, 0) before control, the HW is "2." After control, the flag FLGn is "0," the four-bit controlled data (b0', b1', b2', b3') are (0, 1, 1, 0) and the HW' is "2."

If four-bit data (b0, b1, b2, b3) are (0, 1, 1, 1) before control, the HW is "3." After control, the flag FLGn is "1," the four-bit controlled data (b0', b1', b2', b3') are (1, 0, 0, 0) and the HW' is "2."

If four-bit data (b0, b1, b2, b3) are (1, 0, 0, 0) before control, the HW is "1." After control, the flag FLGn is "0," the four-bit controlled data (b0', b1', b2', b3') are (1, 0, 0, 0) and the HW' is "1."

If four-bit data (b0, b1, b2, b3) are (1, 0, 0, 1) before control, the HW is "2." After control, the flag FLGn is "1," the four-bit controlled data (b0', b1', b2', b3') are (0, 1, 1, 0) and the HW' is "3."

If four-bit data (b0, b1, b2, b3) are (1, 0, 1, 0) before control, the HW is "2." After control, the flag FLGn is "1," the four-bit controlled data (b0', b1', b2', b3') are (0, 1, 0, 1) and the HW' is "3."

If four-bit data (b0, b1, b2, b3) are (1, 0, 1, 1) before control, the HW is "3." After control, the flag FLGn is "0," the four-bit controlled data (b0', b1', b2', b3') are (1, 0, 1, 1) and the HW' is "3."

If four-bit data (b0, b1, b2, b3) are (1, 1, 0, 0) before control, the HW is "2." After control, the flag FLGn is "1," the four-bit controlled data (b0', b1', b2', b3') are (0, 0, 1, 1) and the HW' is "3."

If four-bit data (b0, b1, b2, b3) are (1, 1, 0, 1) before control, the HW is "3." After control, the flag FLGn is "0," the four-bit controlled data (b0', b1', b2', b3') are (1, 1, 0, 1) and the HW' is "3."

If four-bit data (b0, b1, b2, b3) are (1, 1, 1, 0) before control, the HW is "3." After control, the flag FLGn is "0," the four-bit controlled data (b0', b1', b2', b3') are (1, 1, 1, 0) and the HW' is "3."

If four-bit data (b0, b1, b2, b3) are (1, 1, 1, 1) before control, the HW is "4." After control, the flag FLGn is "1," the four-bit controlled data (b0', b1', b2', b3') are (0, 0, 0, 0) and the HW' is "1."

FIG. 21 shows how the controlled values "b0'" through "b3'" are related to the original values "b0" through "b3." In each group of bits, half of the "0" bits are inverted to "1" and half of the "1" bits are inverted to "0."

FIG. 21 also indicates relations between different bits. Under flag control, between, say, the data "b0" and the data "b0'" having been controlled, there occurs a sufficiently disturbed relationship (i.e., a state in which half of the "0" bits and half of the "1" bits are inverted). However, if this kind of control reinforces the correlation between the data "b1'" and the data "b0," then there is a possibility that a key can be found from the leaked data "b1'."

To avoid such an eventuality, all combinations of bits in control units of data subject to flag control are checked. As a result, in any such combination, four out of eight "0" bits remain "0" and the rest are inverted to "1." Four out of eight "1" bits remain "1" and the rest are inverted to "0." Regardless of the data bits being "0" or "1," data inversion takes place with a 50 percent probability.

The flag operation circuit of FIG. 19 is an example, and any other suitable structure that meets the requirements of FIG. 21 provides the same effects. Suppose that sixteen four-bit data "d0" through "d15" in all their combinations are subject to data inversion with the 50 percent probability, that "1" is set to each of the bits to be inverted, and that the results are expressed in hexadecimal notation. This provides 10 data as follows: (d0, d1, d14, d15)=3 cc3, 5aa5, 6699, 6969, 6996, 9669, 9696, 9966, a55a, c33c.

Figure 22:
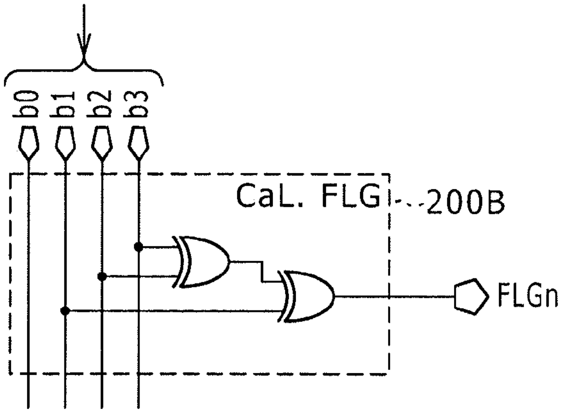
FIG. 22 is a schematic view showing data control examples of “6969” subject to inversion control on d1, d2, d4, d7, d9, d10, d12, and d15, given here in connection with the circuit of FIG. 19.

What is shown in FIG. 19 is a typical circuit structure regarding "6969" for inversion control on d1, d2, d4, d7, d9, d10, d12, and d15. Shown in FIG. 22 are examples of controlled data regarding "6969" for inversion control on d1, d2, d4, d7, d9, d10, d12, and d15, in contrast with the circuit of FIG. 19.

What follows is a description of the relational aspects of the data subject to flag operations. The data combinations to be submitted to flag operations are typically those output through F-function-based permutation (P) and arranged into units of four bits in ascending order of bit numbers.

The relations at this point between the units for flag operations and the sub-S-boxes subject to DPA attacks are as shown in FIG. 16. In this setup, the bits enclosed by dotted lines downstream of permutation (P) are groups of four bits constituting the units for flag operations. Suppose that the sub-S-box "S0" is under attack. In this case, the four bits output from the sub-S-box "S0" are assigned to different flag operation units through permutation (P), and the individual flag operation circuits perform the flag operations between the signals output from different sub-S-boxes for inversion control.

For example, bit 0 of the sub-S-box "S0" is made to undergo the flag operations with bit 2 of the sub-S-box "S3," bit 2 of the sub-S-box "S5," and bit 1 of the sub-S-box "S6," and is subjected to inversion control based on the results of the operations.

In like manner, the other bits of the sub-S-box "S0" are made to undergo the flag operations with the bits of the different sub-S-boxes for inversion control. In DPA attacks, the key is estimated for a single sub-S-box at a time; the other sub-S-boxes are not considered for estimation and their operating currents are statistically processed as noise currents.

In estimating a six-bit key to one sub-S-box alone, 64 (=$2^6$) current waveforms are statistically processed into a single DPA waveform. With the inventive structure of the fourth embodiment in use, each of the four output bits is arranged to undergo the operations with the bits of the different sub-S-boxes for inversion control. This arrangement provides the same effects as random disturbance and thus desires a second and higher orders of DPA attacks. If it is desired to estimate the keys to three sub-S-boxes that contain the remaining three bits of the bit group of interest under inversion control, then it is necessary statistically to process $1.7\times10^7$ (=$2^{6\times4}$=$2^{24}$) current waveforms. This makes successful DPA attacks considerably difficult to accomplish.

If a DPA attack is carried out based on the estimation of the key to one existing sub-S-box and if the fourth embodiment is in use, the next order of DPA attacks is desired. That is, with data subject to inversion control based on the flag value, the fourth embodiment provides the same effects as random disturbance. It is difficult to extract any further key at least from the first order of DPA attacks; the second and higher orders of DPA attacks are desired. Also, the fourth embodiment brings about the above scheme of disturbance without recourse to a random number generator.

<5. Fifth Embodiment>

The foregoing description has discussed the first, the second, the third and the fourth embodiments practiced by applying the embodiments of the present invention to DES (Data Encryption Standard). What follows is a description of the fifth embodiment of the present invention implemented by applying the concept of the invention to AES (Advanced Encryption Standard).

Figure 23:
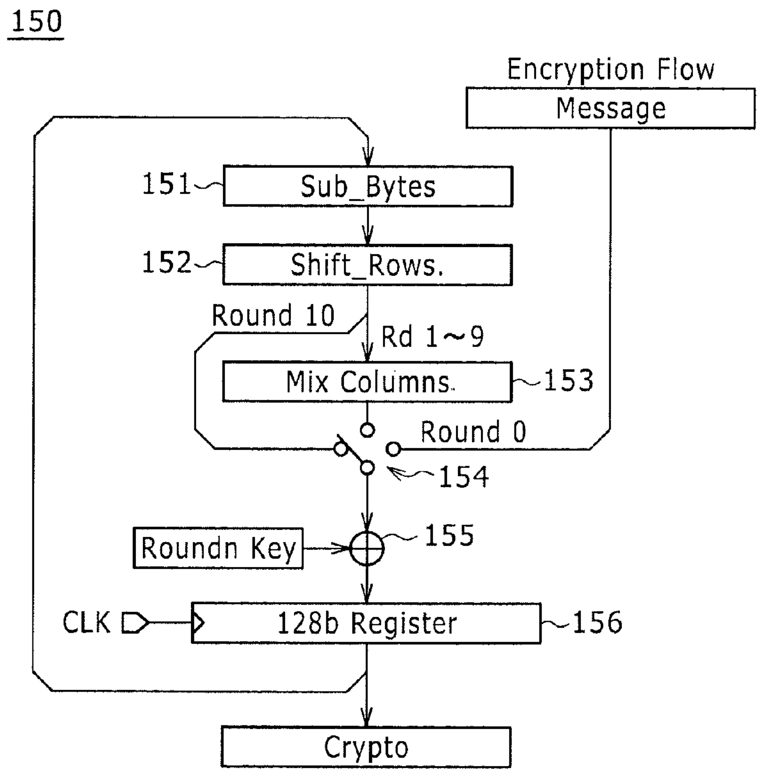
FIG. 23 is a schematic view showing a typical structure of the general AES operation circuit.
Figure 24:
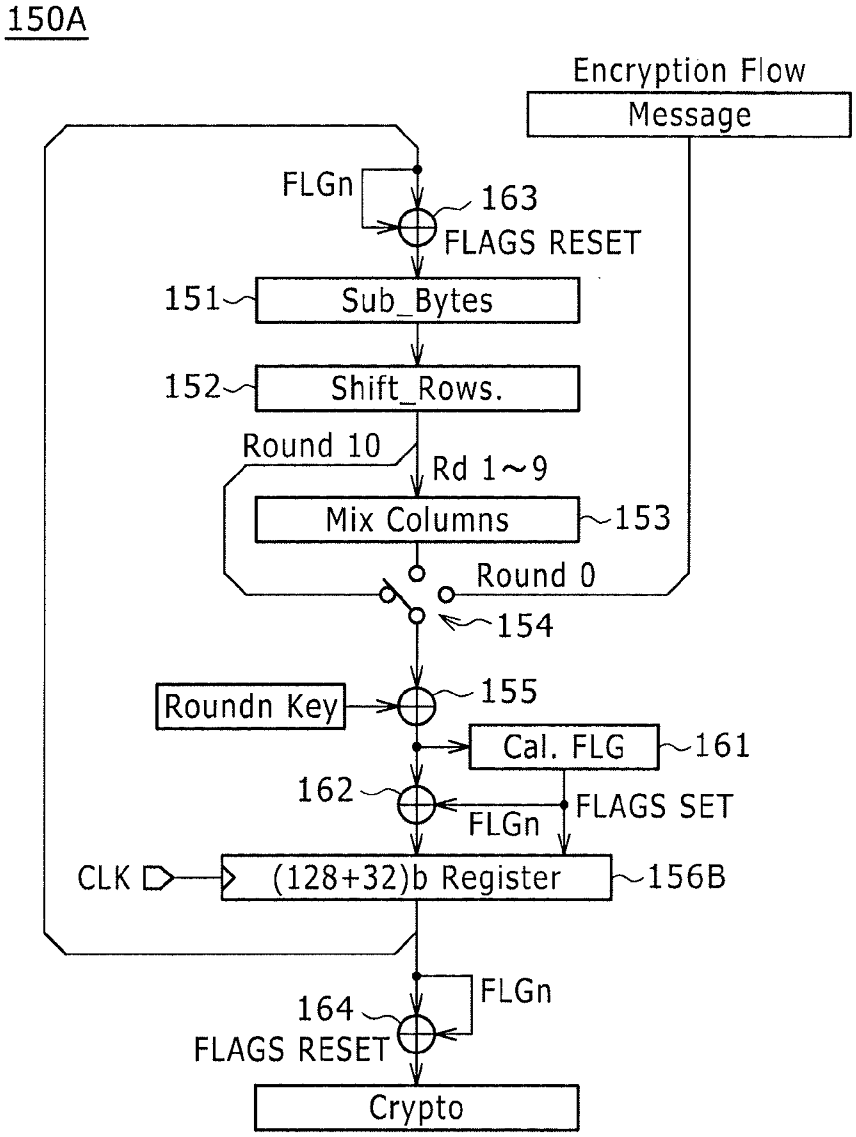
FIG. 24 is a schematic view showing a typical structure of an AES operation circuit practiced as a fifth embodiment of the present invention.

FIG. 23 is a schematic view showing a typical structure of the general AES operation circuit. FIG. 24 is a schematic view showing a typical structure of an AES operation circuit practiced as the fifth embodiment of the present invention.

According to AES, the data length is 128 bits whereas three key lengths, 128 bits, 192 bits and 256 bits, are registered with FIPS (Federal Information Processing Standards) as AES-128, AES-192 and AES-256, respectively. The number of operation rounds varies depending on the key length, i.e., 10, 12 and 14 for AES-128, AES-192 and AES-256, respectively. The case of AES-128 will now be described.

The AES operation circuit 150 in FIG. 23 includes a sub-byte conversion device 151, a shift row conversion device 152, a mix column conversion device 153, a switch 154, an EXOR operation device 155, and a 128-bit register 156.

The sub-byte conversion device 151 executes the Sub_Bytes( ) function for substitution conversion using an S-box. The shift row conversion device 152 carries out the Shift_Rows( ) function to shift the byte data coming from the sub-byte conversion device 151. The mix column conversion device 153 performs the Mix_Columns( ) function to execute matrix operations using GF($2^8$). In the structure of FIG. 23, the register 156 is disposed immediately upstream of the sub-byte conversion section (Sub_Bytes( ) function) 151. Alternatively, the register 156 may be positioned elsewhere.

In a cipher operation, a plain text is first exclusive-OR'ed with the key of round 0 before getting latched in the register 156. When the output of the register 156 changes, the Sub_Bytes( ) function and Shift_Rows( ) function are executed. The Mix_Columns( ) function is performed successively up to round 9. The result of this operation is exclusive-OR'ed with the round key. In round 10, the Mix_Columns( ) function is skipped, and the result of the execution of the Shift_Rows( ) function is exclusive-OR'ed with the round key before getting latched in the register 156. This is the basic process carried out by the AES operation circuit 150.

An AES operation circuit 150A practiced as the fifth embodiment has a flag operation device 161 and an EXOR operation device 162 disposed on the output side of the EXOR operation device 155. In the AES operation circuit 150A, a (128+32)-bit register 156A is disposed on the output side of the EXOR operation device 162. Also in the AES operation circuit 150A, an EXOR operation device 163 for resetting flags is disposed on the input side of the sub-byte conversion device 151 and another EXOR operation device 164 for resetting flags is positioned on the encrypted text output side of the sub-byte conversion device 151.

The AES operation circuit 150A of FIG. 24 adopts a control scheme for subjecting data to flag operations in groups of four bits. Under this scheme, the flag operation and inversion control are effected on the target data following the EXOR operation with the round key, and the flag is reset immediately upstream of the sub-byte conversion device 151.

The scheme above reduces the charging and discharging currents on the buses involved. In terms of the structure for boosting resistance to DPA, the fifth embodiment may also adopt the arrangements discussed above regarding DES to enhance DPA resistance. The fifth embodiment of the present invention thus provides substantially the same effects as those realized by the first through the fourth embodiments discussed earlier.

As described above, the fifth embodiment reduces the charging and discharging currents on the buses and lowers power consumption by encryption circuits. By keeping constant the charging and discharging currents on the buses regardless of data, the fifth embodiment increases resistance to DPA. In this case, the amount of the charging and discharging currents on the signal bus is kept substantially at half that of the complementary structure. The embodiment also provides the same effects as those of random number disturbance and thereby enhances resistance to DPA without recourse to a random number generator.

Figure 25:
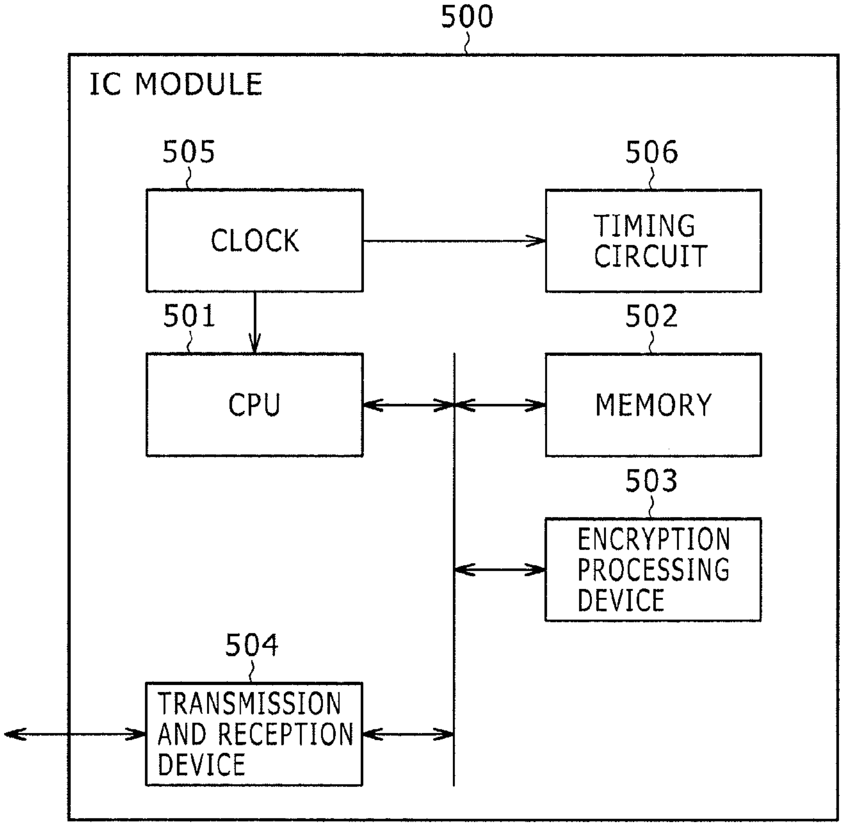
FIG. 25 is a schematic view showing a typical structure of an IC module as an encryption procession device to which the structures of the embodiments of the present invention are applicable.

What follows is a description of an IC module 500 as a device for performing the above-described encryption processes in reference to FIG. 25. These processes may be carried out by diverse kinds of information processing apparatuses such as a PC, an IC card and a reader-writer. The IC module 500 shown in FIG. 25 may be incorporated in any of these apparatuses.

In FIG. 25, a CPU (central processing unit) 501 is a processor that executes diverse programs for starting and ending encryption processing, for controlling the transmission and reception of data, for controlling the transfer of data between components, and for carrying out other processes.

A memory 502 includes a ROM (read only memory) that stores the programs to be executed by the CPU 501 as well as fixed data for use as operation parameters. The memory 502 also includes a RAM (random access memory) that serves as a storage and work area for accommodating the programs being executed by the CPU 501 and for holding the parameters as they vary in keeping with program execution.

The memory 502 may be used as a region for storing keys and other data necessary for encryption processing. The areas for storing data and other resources in the memory 502 should preferably be structured to be tamperproof.

An encryption processing device 503 is a device that executes encryption algorithms such as the above-described DES algorithm including reiterations of a plurality of round functions. That is, the encryption processing device 503 is a device to which may be applied the DES operation circuits practiced as the first through the fourth embodiments of the invention as well as the AES operation circuit practiced as the fifth embodiment thereof.

A transmission and reception device 504 is a data communication processing device that allows the IC module 500 to conduct data communications with the outside. Illustratively, the transmission and reception device 504 enables the IC module 500 to output encrypted texts generated inside and to input data coming from an external apparatus such a reader-writer.

Various control signals used by the encryption processing device 503, including the above-mentioned control signal for operating the switches, are generated by a timing generator circuit 506 that acts when triggered by a clock signal coming from a clock generator circuit 505. The timing generator circuit 506 supplies the generated signals to the encryption processing device 603.

It is to be understood that while the invention has been described in conjunction with specific embodiments, it is evident that many alternatives, modifications and variations will become apparent to those skilled in the art in light of the foregoing description. Accordingly, it is intended that the present invention embrace all such alternatives, modifications and variations as fall within the spirit and scope of the appended claims.

The present application contains subject matter related to that disclosed in Japanese Priority Patent Application JP 2009-061537 filed in the Japan Patent Office on Mar. 13, 2009, the entire content of which is hereby incorporated by reference.

What is claimed is:

1. An encryption processing apparatus comprising:

a first register device configured to include a first data register and a first flag register;

a second register device configured to include a second data register and a second flag register;

a first flag operation device configured to perform flag operations on first data and second data of an input plain text for each group of a predetermined number of bits;

a first operation device configured to cause said first flag operation device to perform exclusive-OR operations on each of said first and said second data and on the flags in effect for flag control, said first operation device being further configured to feed the flag-controlled first data and first flag to said first register device and the flag-controlled second data and second flag to said second register device;

a second operation device configured to perform exclusive-OR operations on the latched data in said second data register of said second register device and on the flag of the second flag register;

a round operation device configured to perform a round operation on output data from said second operation device;

a third and a fourth operation device configured to perform exclusive-OR operations on the output from said round operation device and on the latched value in said first data register of said first register device as well as on the flag of said first flag register;

a second flag operation device configured to perform a new flag operation on output data from said third and said fourth operation devices for each group of a predetermined number of bits; and a fifth operation device configured to cause said second flag operation device to perform exclusive-OR operations on the output data from said third and said fourth operation devices and on the flags in effect for flag control, said fifth operation device being further configured to output the flag-controlled data and flags to said second register device.

2. The encryption processing apparatus according to claim 1, wherein, of said first and said second flag operation devices, at least said second flag operation device sets the flag if the number of "1" bits is a majority in said predetermined number of bits and inverts the corresponding data accordingly.

3. The encryption processing apparatus according to claim 2, further comprising flag wires for the flag registers, wherein an additional flag is set if the Hamming weight within said number of bits is 0, 1 or 4 and said flag wires are charged accordingly.

4. The encryption processing apparatus according to claim 1, wherein, of said first and said second flag operation devices, at least said second flag operation device generates flag data in keeping with a bit pattern of said predetermined number of bits and inverts the corresponding data based on the generated flag data.

5. The encryption processing apparatus according to claim 1, wherein said third operation device performs an exclusive-OR operation on the output from said round operation device and on the latched value in said first data register of said first register device, and said fourth operation device performs an exclusive-OR operation on the output from said third operation device and on the flag in said first flag register of said first register device, said fourth operation device further outputting the result of the operation to said second flag operation device and said fifth operation device.

6. The encryption processing apparatus according to claim 1, wherein said fourth operation device performs an exclusive-OR operation on the output from said round operation device and on the flag in said first flag register of said first register device, and said third operation device performs an exclusive-OR operation on the output from said fourth operation device and on the latched data in said first data register of said first register device, said third operation device further outputting the result of the operation to said second flag operation device and said fifth operation device.

7. The encryption processing apparatus according to claim 1, further comprising:

a first control device configured to control the output from said first register device; and a second control device configured to control the output from said second register device; wherein said first control device controls output of the latched data from said first data register and from said first flag register at the timing obtained by adding a delay in said round operation device to the output timing of said second control device.

8. The encryption processing apparatus according to claim 1, wherein one round is made up of a pre-charge phase and an evaluation phase, load wires for said first and said second register devices are set to a predetermined potential in said pre-charge phase, and the latched data in said first and said second register devices are output in said evaluation phase.

9. The encryption processing apparatus according to claim 7, wherein said first control device performs a logical operation on the output from said first register device and on a first control signal so as to control said output, said second control device performs a logical operation on the output from said second register device and on a second control signal so as to control said output, and said first control signal is generated by a logical operation performed on a monitor signal of the output from said round operation device and on a delay signal of said second control signal.

10. The encryption processing apparatus according to claim 1, wherein said round operation device includes a plurality of sub-S-boxes and S-boxes configured to perform nonlinear conversion processes, and said predetermined number of bits are selected in such a manner that, of the output signals from said plurality of sub-S-boxes, those from at least two sub-S-boxes are included in the bits.

11. The encryption processing apparatus according to claim 10, wherein said round operation device includes:

an expansion device configured to expand the bits of the latched data in said second register;

an exclusive logical operation device configured to perform an exclusive logical operation on the expanded data from said expansion device and on a key so as to output the result of the operation to said S-boxes; and a permutation device configured to perform bit position permutation on the results of the nonlinear processes performed by said S-boxes.

12. The encryption processing apparatus according to claim 1, further comprising a flag resetting device configured to perform an exclusive-OR operation on the operation result to be output and on a predetermined flag in order to reset the flags.

13. The encryption processing apparatus according to claim 1, wherein said encryption processing apparatus performs encryption processing operations in accordance with either the Data Encryption Standard algorithm known as DES or the Advanced Encryption Standard known as AES.

14. An encryption processing apparatus comprising:

first register means for including a first data register and a first flag register;

second register means for including a second data register and a second flag register;

first flag operation means for performing flag operations on first data and second data of an input plain text for each group of a predetermined number of bits;

first operation means for causing said first flag operation means to perform exclusive-OR operations on each of said first and said second data and on the flags in effect for flag control, said first operation means being further for feeding the flag-controlled first data and first flag to said first register means and the flag-controlled second data and second flag to said second register means;

second operation means for performing exclusive-OR operations on the latched data in said second data register of said second register means and on the flag of the second flag register;

round operation means for performing a round operation on output data from said second operation means;

third and fourth operation means for performing exclusive-OR operations on the output from said round operation means and on the latched value in said first data register of said first register means as well as on the flag of said first flag register;

second flag operation means for performing a new flag operation on output data from said third and said fourth operation means for each group of a predetermined number of bits; and fifth operation means for causing said second flag operation means to perform exclusive-OR operations on the output data from said third and said fourth operation means and on the flags in effect for flag control, said fifth operation means being further for outputting the flag-controlled data and flags to said second register means.

* * * * *